United States Patent
Satoyama et al.

(10) Patent No.: US 8,495,293 B2
(45) Date of Patent: Jul. 23, 2013

(54) STORAGE SYSTEM COMPRISING FUNCTION FOR CHANGING DATA STORAGE MODE USING LOGICAL VOLUME PAIR

(75) Inventors: Ai Satoyama, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 785 days.

(21) Appl. No.: 11/969,323

(22) Filed: Jan. 4, 2008

(65) Prior Publication Data
US 2009/0055593 A1 Feb. 26, 2009

(30) Foreign Application Priority Data

Aug. 21, 2007 (JP) ................. 2007-215212

(51) Int. Cl.
*G06F 12/00* (2006.01)
*G06F 13/00* (2006.01)
*G06F 13/28* (2006.01)

(52) U.S. Cl.
USPC .......................... 711/114; 711/134

(58) Field of Classification Search
USPC ................. 711/134, 114
See application file for complete search history.

(56) References Cited

U.S. PATENT DOCUMENTS

| 7,181,583 | B2 | 2/2007 | Saika | |
|---|---|---|---|---|
| 7,398,364 | B2 | 7/2008 | Maruyama et al. | |
| 7,587,627 | B2 | 9/2009 | Mizuno et al. | |
| 2003/0131278 | A1 | 7/2003 | Fujibayashi | |
| 2003/0204597 | A1* | 10/2003 | Arakawa et al. | 709/226 |
| 2004/0034808 | A1* | 2/2004 | Day et al. | 714/6 |
| 2004/0205312 | A1* | 10/2004 | Zlotnick et al. | 711/162 |
| 2004/0254964 | A1* | 12/2004 | Kodama et al. | 707/204 |
| 2005/0125609 | A1* | 6/2005 | Satoyama et al. | 711/114 |
| 2005/0193180 | A1* | 9/2005 | Fujibayashi | 711/162 |
| 2006/0095640 | A1* | 5/2006 | Mimatsu et al. | 710/311 |
| 2006/0095709 | A1* | 5/2006 | Achiwa | 711/173 |
| 2006/0195666 | A1* | 8/2006 | Maruyama et al. | 711/162 |
| 2006/0236050 | A1 | 10/2006 | Sugimoto et al. | |
| 2007/0101082 | A1* | 5/2007 | Sugiura et al. | 711/165 |
| 2007/0186067 | A1* | 8/2007 | Nagata et al. | 711/162 |

FOREIGN PATENT DOCUMENTS

| JP | 2003-242011 | 8/2003 |
|---|---|---|
| JP | 2006065622 | 3/2006 |
| JP | 2006236019 | 9/2006 |
| JP | 2006285919 | 10/2006 |
| JP | 2006338064 | 12/2006 |

* cited by examiner

*Primary Examiner* — Sheng-Jen Tsai
(74) *Attorney, Agent, or Firm* — Brundidge & Stanger, P.C.

(57) ABSTRACT

A storage system writes a data element stored in a primary volume to a secondary volume constituting a volume pair with the primary volume in accordance with a selected storage mode, which is a data storage mode selected from a plurality of types of data storage modes. This storage system is provided with a function for switching the above-mentioned selected storage mode from a currently selected data storage mode to a different type of data storage mode.

18 Claims, 22 Drawing Sheets

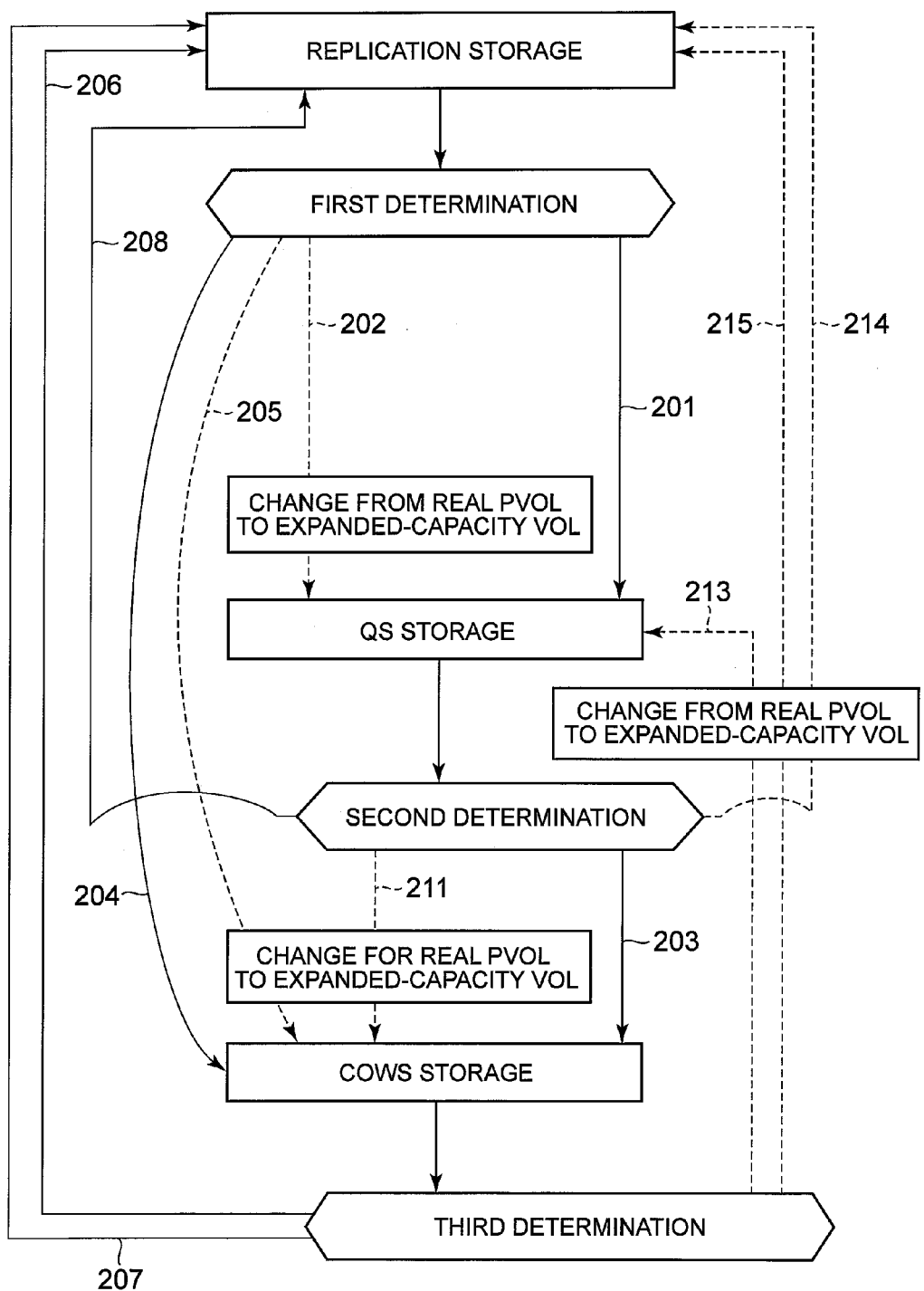

REPLICATION STORAGE

QS STORAGE

COWS STORAGE

AREA DATA TABLE 910 RECORD

POOL AREA MANAGEMENT TABLE 920 RECORD

| VOL NO. | VOL TYPE | DATA STORAGE MODE | PAIR-PARTNER VOL NO. | PAIR STATUS | ... |
|---|---|---|---|---|---|
| 1 | REAL/ PRIMARY | QS | 2,3 | — | ... |
| 2 | VIRTUAL/ SECONDARY | QS | 1 | — | ... |
| ⋮ | ⋮ | ⋮ | ⋮ | ⋮ | ⋮ |

STORAGE SYSTEM COMPRISING FUNCTION FOR CHANGING DATA STORAGE MODE USING LOGICAL VOLUME PAIR

CROSS-REFERENCE TO PRIOR APPLICATION

This application relates to and claims the benefit of priority from Japanese Patent Application number 2007-215212, filed on Aug. 21, 2007, the entire disclosure of which is incorporated herein by reference.

BACKGROUND

The present invention generally relates to the storage of data using a logical volume pair.

A storage system having a function for backing up data stored in a certain logical volume is known (for example, Japanese Patent Laid-open No. 2003-242011).

For example, a command, which specifies a logical volume, can be issued, and an operations check to determine whether or not processing is being executed normally in accordance with this command, can be carried out. When data is stored in the command-specified logical volume, and an abnormality occurs when processing the command, there is the danger of this data being destroyed. As a method for avoiding this, it is possible to replicate data stored in a primary logical volume (PVOL hereinafter) in a secondary logical volume (SVOL hereinafter) having storage capacity in excess of the storage capacity of the PVOL, and to issue a command, which specifies the SVOL during the above-mentioned operations check.

Subsequent to the operations check, there is no need to keep the data stored in the above-mentioned SVOL, but since this is data which was purposely prepared, it can be saved as a backup of the data stored in the PVOL. However, since the storage capacity of the above-mentioned SVOL exceeds the storage capacity of the PVOL, simply saving the data as-is to this SVOL is a waste of storage system storage capacity.

The above mentioned problem is not limited to an operations check, and may occur in other situations as well.

Further, for example, there is the following data storage mode, that is, a data storage mode in which an SVOL is treated as a virtual logical volume, and a real storage area proportional to the size of the data actually stored in this SVOL is reserved, and this data is stored in this reserved real storage area. However, when the SVOL access frequency is high in this type of data storage mode, there is the danger of storage system performance deteriorating. This is due to the need to search out which real storage area is correspondent to which SVOL virtual storage area.

SUMMARY

Therefore, an object of the present invention is to strive to cut back on the storage capacity consumed by the storage system, and/or to enhance the performance of the storage system.

Other objects of the present invention should become clear from the following explanation.

The storage system writes a data element stored in a primary volume to a secondary volume, which constitutes a volume pair with the primary volume, in accordance with a selected storage mode, which is a data storage mode selected from a plurality of types of data storage modes. This storage system is provided with a function for switching the above-mentioned selected storage mode from the currently selected data storage mode to a different type of data storage mode.

BRIEF DESCRIPTION OF THE DRAWINGS

FIG. 2 shows an example of the step-by-step flow of the switching of a data storage mode;

FIG. 18 shows an example of the configuration of a VOL management table;

DETAILED DESCRIPTION OF THE PREFERRED EMBODIMENT

Figure 1:
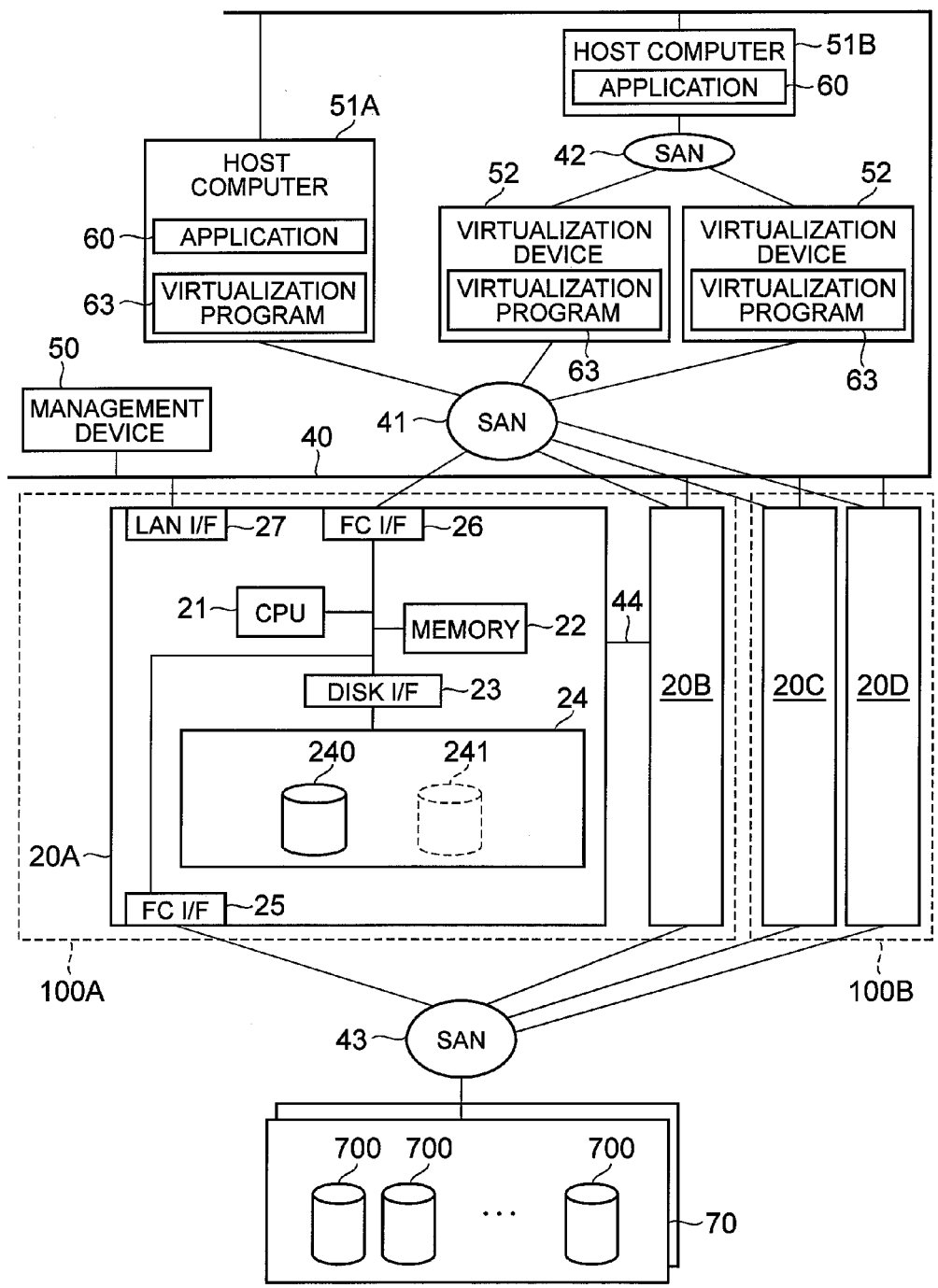
FIG. 1 shows an example of the overall configuration of a system related to an embodiment of the present invention.

In an embodiment 1, the storage system comprises one or more logical volumes and a controller. The one or more logical volumes have at least one of a primary volume, and a secondary volume, which constitutes a volume pair together with the primary volume. The controller writes a data element stored in a primary volume to a secondary volume, which constitutes a volume pair with the primary volume, in accordance with a selected storage mode, which is a data storage mode selected from a plurality of types of data storage modes. This controller has a function for switching the above-mentioned selected storage mode from the currently selected type of data storage mode to a type of data storage mode that differs therefrom.

In an embodiment 2 according to the embodiment 1, the controller is constituted such that, upon receiving an I/O command from a computer, the controller accesses a logical volume specified by this I/O command, and the storage area thereof. Further, the controller is constituted such that, when switching the selected storage mode, the controller changes the type of the secondary volume from the type corresponding to the data storage mode of prior to switching to the type corresponding to the data storage mode of subsequent to switching, by carrying out specified processing for the respective storage areas constituting the secondary volume conforming to the pre-switch data storage mode. In addition, the controller is constituted so as to execute selected storage mode switching while receiving an I/O command from a computer. When the I/O command received from the computer is a write command, the controller controls the writing of the write-targeted data element conforming to this write command based on whether or not the write destination specified by this write command is a primary volume, or a pre-switch secondary volume, and whether or not the write-destination storage area is a storage area for which the above-mentioned specified processing has been completed.

Here, for example, specified processing will differ according to a pre-switch data storage mode and a post-switch data storage mode. More specifically, for example, if the pre-switch data storage mode is a replication mode, which will be described hereinbelow, and the post-switch data storage mode is a snapshot mode, which will be described hereinbelow, in the above-mentioned specified processing, a determination is carried out as to whether or not the data element stored in a storage area of the primary volume in the pre-switch data storage mode and the data element stored in a storage area of the secondary volume thereof duplicate one another. If there is no duplication at this time, processing by which this data element is written to a storage area of the secondary volume in the post-switch data storage mode is also carried out.

In an embodiment 3 according to at least one of the embodiments 1 and 2, the controller is constituted such that, when switching the selected storage mode, the controller changes the type of the secondary volume from the type corresponding to the pre-switch data storage mode to the type corresponding to the post-switch data storage mode, by carrying out specified processing for the respective storage areas constituting the secondary volume conforming to the pre-switch data storage mode, and in the specified processing, if the data element stored in the storage area, which is the destination of this specified processing, is a prescribed data pattern, the controller releases this storage area.

The prescribed data pattern here, for example, can be a data pattern in which the data element represents '0'.

Further, for example, in the embodiment 3, the secondary volume of the type corresponding to the pre-switch data storage mode is a virtual volume, which is a virtual logical volume, and the virtual volume is constituted by a plurality of virtual areas, which are virtual storage areas. One or more logical volumes comprise a pool volume, which is a logical volume constituting a pool. The controller is constituted so as to allocate a pool area, which is a storage area constituting the pool volume, to a virtual area of the virtual volume, and to write the data element stored in this virtual area to the allocated pool area. When switching the selected storage mode, if the data element stored in the virtual area is a prescribed data pattern, the controller releases the pool area allocated to this virtual area.

In an embodiment 4 according to at least one of the embodiments 1 to 3, the controller either switches the primary volume from a real logical volume formed on the basis of a physical storage device to a virtual logical volume (for example, a virtual volume, which conforms to Thin Provisioning technology), or switches the primary volume from a virtual logical volume (for example, a virtual volume, which conforms to Thin Provisioning technology) to the real logical volume, in accordance with the number of data elements of a prescribed data pattern stored in the primary volume.

In an embodiment 5 according to the embodiment 4, the controller, in switching from the real logical volume to a virtual logical volume (for example, a virtual volume, which conforms to Thin Provisioning technology), if the data element stored in the real logical volume is a prescribed data pattern, releases the storage area in which this data element is stored.

In an embodiment 6 according to at least one of the embodiments 1 to 5, the controller switches the selected storage mode based on at least one of the number of data elements stored in the secondary volume; the number of mutually duplicated data elements existing in a plurality of secondary volumes constituting a plurality of volume pairs with the primary volume; and the number of accesses generated to the secondary volume.

In an embodiment 7 according to the embodiment 6, the controller compares a first value, which is computed based on one or more first data elements stored in a certain secondary volume of the plurality of secondary volumes, and which has a smaller data size than this one or more first data elements, against a second value, which is computed based on one or more second data elements stored in a different secondary volume than the certain secondary volume, and which has a smaller data size than this one or more second data elements. If the first value and second value do not match, the controller determines that the first data element and the second data element do not duplicate one another, and if the first value and the second value do match, the controller compares the first data element against the second data element. If the first data element and the second data element do not match, the controller determines that the first data element and the second data element do not duplicate one another, and if the first data element and the second data element do match, the controller determines that the first data element and the second data element duplicate one another.

In an embodiment 8 according to the embodiment 7, the first value is either a hash value of one or more first data elements, or a redundancy code corresponding to one or more first data elements. The second value is either a hash value of one or more second data elements, or a redundancy code corresponding to one or more second data elements.

In an embodiment 9 according to at least one of the embodiments 1 to 8, the controller is constituted such that, when switching the selected storage mode, the controller changes the type of the secondary volume from the type corresponding to the pre-switch data storage mode to the type corresponding to the post-switch data storage mode, by carrying out specified processing for the respective storage areas constituting the pre-switch secondary volume conforming to the pre-switch data storage mode. If the data element stored in the pre-switch secondary volume is an encrypted data element, the controller makes the data element stored in the post-switch secondary volume an encrypted data element.

In an embodiment 10 according to the embodiment 9, when the data element stored in the post-switch secondary volume is not made an encrypted data element even though the data element stored in the pre-switch secondary volume is an encrypted element, the controller issues a warning to a user.

In an embodiment 11 according to at least one of the embodiments 9 and 10, if the encryption method and/or encryption key used to encrypt the data element stored in the primary volume differ from the encryption method and/or encryption key used to encrypt the data element stored in the pre-switch secondary volume, the controller changes the encryption method and/or encryption key used to encrypt the data element stored in the post-switch secondary volume to the encryption method and/or encryption key of the data element stored in the primary volume.

In an embodiment 12 according to at least one of the embodiments 1 to 11, the controller has a cache memory, and when, in response to a read command from a computer, there is a cache hit signifying that the read-targeted data element is in the cache memory, the controller is constituted so as to send this data element to the computer, and when there is no cache hit, the controller reads the data element specified by this read command from the logical volume, stores the data element in the cache memory, and sends the data element stored in the cache memory to the computer. There is a first linked volume comprising a first logical volume and a second logical volume. The controller creates a second linked volume comprising a third logical volume and a fourth logical volume by applying a non-duplication storage mode of the plurality of data storage modes to the first linked volume. At least the first logical volume of the first through the fourth logical volumes is a real logical volume formed on the basis of a physical storage device. A first volume pair is constituted by the first logical volume and the third logical volume, the first logical volume is the primary volume, and the third logical volume is the secondary volume that treats the first logical volume as the primary volume. A second volume pair is constituted by the second logical volume and the fourth logical volume, and the second logical volume is the primary volume, and the fourth logical volume is the secondary volume that treats the second logical volume as the primary volume. The non-duplication storage mode is a storage mode in which, when duplicate data elements are stored in a plurality of secondary volumes, which respectively make up a plurality of volume pairs with a primary volume, one storage area in which one data element is stored is associated to the other storage area in which the other data element is stored, so that when an access is generated to the one storage area thereafter, access is carried out to the other storage area associated to the one storage area. Either a data element that is common to the first linked volumes and the second linked volumes, or a data element with a low cache hit ratio is stored in the first logical volume. Either a data element, which is not the above-mentioned shared data element, or a data element with a high cache hit ratio, is stored in the second logical volume.

In an embodiment 13 according to at least one of the embodiments 1 to 12, one or more logical volumes comprise a pool volume, which is a logical volume constituting a pool. The controller either switches the selected storage mode from the replication mode to a snapshot mode, or switches the selected storage mode from the snapshot mode to the replication mode. In the replication mode, the secondary volume is a real logical volume formed based on a physical storage device, and is stored with all the data elements stored in the primary volume. In the snapshot mode, a snapshot image of the primary volume is constituted by the primary volume and a secondary volume, and this secondary volume is a virtual volume, which is a virtual logical volume. The virtual volume is constituted by a plurality of virtual areas, which is a plurality of virtual storage areas. A pool area, which is a storage area constituting the pool volume, is allocated to the virtual area, and a data element stored in this virtual area is stored in the allocated pool area.

In an embodiment 14 according to the embodiment 13, if the pre-switch data storage mode is the replication mode, the controller switches the selected storage mode from the replication mode to the snapshot mode when at least one of the following occurs: the consumption rate, which is the ratio of the total amount of data elements relative to the storage capacity of the secondary volume, is lower than a prescribed consumption rate; the total amount of mutually duplicated data elements in a plurality of secondary volumes constituting a plurality of volume pairs with the primary volume is greater than a prescribed total amount; and the frequency of accesses to the secondary volume is lower than a prescribed access frequency.

In an embodiment 15 according to at least one of the embodiments 13 and 14, if the pre-switch data storage mode is the snapshot mode, the controller switches the selected storage mode from the snapshot mode to the replication mode when at least one of the following occurs: the consumption rate, which is the ratio of the total amount of data elements relative to the storage capacity of the secondary volume, is higher than a prescribed consumption rate; the total amount of mutually duplicated data elements in a plurality of secondary volumes constituting a plurality of volume pairs with the primary volume is smaller than a prescribed total amount; and the frequency of accesses to the secondary volume is higher than a prescribed access frequency.

In an embodiment 16 according to at least one of the embodiments 13 to 15, the snapshot modes are a duplication snapshot mode and a non-duplication snapshot mode. In the duplication snapshot mode, when there is a plurality of secondary volumes for one primary volume, a data element in the one primary volume is saved to the plurality of secondary volumes. In the non-duplication snapshot mode, when there is a plurality of secondary volumes for one primary volume, a data element in the one primary volume is saved to one secondary volume in a certain virtual area of the plurality of secondary volumes, and virtual areas in the respective other secondary volumes in the plurality of secondary volumes are either associated to the certain virtual area, or to a pool area allocated to the certain virtual area. The controller either switches the selected storage mode from the replication mode to the duplication snapshot mode, and thereafter switches from the duplication snapshot mode to the non-duplication snapshot mode, or switches the selected storage mode from the replication mode to the non-duplication snapshot mode.

Or, the controller either switches from the non-duplication snapshot mode to the duplication snapshot mode, and thereafter switches from the duplication snapshot mode to the replication mode, or switches from the non-duplication snapshot mode to the replication mode.

In an embodiment 17 according to the embodiment 16, if the pre-switch data storage mode is the replication mode, the controller switches the selected storage mode from the replication mode to the duplication snapshot mode when at least one of the following occurs: the total amount of mutually duplicated data elements in a plurality of secondary volumes constituting a plurality of volume pairs with the primary volume is not less than a first threshold; the frequency of accesses to a secondary volume is less than a third threshold; and the consumption rate, which is the ratio of the total amount of data elements relative to the storage capacity of the secondary volume, is less than a fifth threshold. When the pre-switch data storage mode is the duplication snapshot mode, the controller switches the selected storage mode from the duplication snapshot mode to the non-duplication snapshot mode when at least one of the following occurs: the total amount of duplicated data elements is not less than a second threshold, which is higher than the first threshold; or the frequency of accesses to a secondary volume is less than a fourth threshold, which is lower than the third threshold.

In an embodiment 18 according to the embodiment 17, when the pre-switch data storage mode is the replication mode, the controller switches the selected storage mode from the replication mode to the non-duplication snapshot mode when at least one of the following occurs: the total amount of duplicated data elements is not less than a second threshold; the frequency of accesses to a secondary volume is less than a fourth threshold; or the consumption rate is not less than a fifth threshold.

In an embodiment 19 according to at least one of the embodiments 1 to 18, the controller makes a secondary volume in a pre-switch data storage mode the primary volume of a secondary volume in a post-switch data storage mode.

In an embodiment 20 according to at least one of the embodiments 9 to 11, if a data element stored in a secondary volume in a post-switch data storage mode is encrypted, but the data elements in the primary volume corresponding to this secondary volume is not encrypted, the controller encrypts the data stored in this primary volume.

Two or more of the embodiments of the above-described embodiments 1 to 20 can be combined. Further, the various types of processing carried out by the controller can be carried out by hardware, a computer program, or a combination thereof (For example, a portion of the processing can be realized by a computer program, and the remainder of the processing can be realized by hardware.). The computer program is executed by being read into a prescribed processor. Further, a storage area residing in a hardware resource, such as a memory, can be arbitrarily utilized during information processing carried out by the computer program being read into the processor. Also, the computer program can be installed in a computer from a CD-ROM or other such recording medium, or the computer program can be downloaded to a computer via a communications network.

The embodiments of the present invention will be explained in detail below using the figures.

First Embodiment

<<Example of System Configuration>>

FIG. 1 shows an example of the overall configuration of a system related to an embodiment of the present invention. In the following explanation, when elements of the same type are being explained without making a distinction between them, the explanation will use a parent number only (for example, 100), and when elements of the same type are being distinguished in the explanation, the explanation will use the parent number and a child reference letter (for example, 100A, 100B).

Virtual storage system 100A comprises a plurality of storage systems 20A and 20B. Virtual storage system 100B comprises a plurality of storage systems 20C and 20D. Virtual storage system 100A and virtual storage system 100B are connected to a SAN (Storage Area Network) 41. The respective storage systems 20A, 20B, 20C, and 20D are connected to an outside storage system 70 via a SAN 43.

The respective storage systems 20A, 20B, 20C, and 20D, a management device 50, and host computers 51A and 51B are connected to a management network (for example, a LAN (Local Area Network)) 40.

A host computer 51 comprises a CPU and storage resource (for example, a memory) not shown in the figure. A computer program is stored in the storage resource, and the CPU can execute this computer program. Hereinafter, when computer program is used as the subject of a sentence, it is supposed that the processing is actually being carried out by the CPU, which executes this computer program.

The host computer 51A is connected to the respective storage systems 20A and 20B via the SAN 41. Host computer 51A has a virtualization program 63, and can recognize the plurality of storage systems 20A and 20B as one logical storage resource (virtual storage system) 100A in accordance with the function of the virtualization program 63.

The other host computer 51B, which does not have the virtualization program 63, is connected to the respective storage systems 20A and 20B via a SAN 42, a virtualization device 52, and SAN 41. Host computer 51B can recognize the plurality of storage systems 20A and 20B as a single storage resource (virtual storage system) 100A in accordance with the function of the virtualization program 63 inside the virtualization device 52.

The virtualization device 52 logically virtualizes storage areas respectively provided by the plurality of storage systems 20A and 20B into a single storage area. The virtualization device 52, for example, is a virtualization switch, intelligent switch, or a dedicated virtualization device.

The respective host computers 51 have an application program 60. The application program 60, for example, is a business program, such as database management software, Web application software, or streaming application software.

The virtualization program 63 manages logical paths between host computer 51A and the logical volumes inside the respective virtual storage systems 100A, 100B.

The storage system 20, for example, can be broadly divided into a controller and a storage unit. The controller, for example, comprises a CPU (Central Processing Unit) 21, a memory 22, a disk interface controller (disk I/F) 23, FC (Fibre Channel) interface controllers (FC I/F) 25, 26, and a LAN interface controller (LAN I/F) 27. The storage unit, for example, is a disk unit 24.

The CPU 21 executes various types of processing by executing various types of computer programs stored in memory 22. Memory 22 comprises a nonvolatile memory for storing various types of computer programs, and a volatile memory (cache memory) for temporarily storing data written to and read from a logical volume.

The CPU 21 is connected to the disk unit 24 via the disk I/F 23. The disk I/F 23 makes it possible for the CPU 21 to access a logical volume.

The disk unit 24 has a plurality of RAID groups, and each RAID group is constituted by a plurality of disk drives 240. Data is written to a RAID group in accordance with the RAID (Redundant Array of Independent (or Inexpensive) Disks) level of the RAID group. A disk drive is the drive for a disk-type storage media (for example, a hard disk, or DVD (Digital Versatile Disk)), and, for example, is an FC (Fibre Channel) disk drive, SATA (Serial Advanced Technology Attachment) disk drive, PATA (Parallel Advanced Technology Attachment) disk drive, FATA (Fibre Attached Technology Adapted) disk drive, SAS (Serial Attached SCSI) disk drive, or SCSI (Small Computer System Interface) disk drive. A RAID group is not limited to disk drives 240, and can also employ other types of physical storage devices. Other types of physical storage devices can include types of storage media (for example, flash memory) drives, which differ from disk-type storage media.

Storage system 20A, for example, comprises a real volume 240, and a virtual volume 241. A real volume is a real logical volume, which is formed on the basis of a RAID group storage space. A virtual volume is a virtual logical volume. The below-described pool area, which is either all or part of a real volume, is correspondent to a virtual volume.

As the real volume 240, there is a real volume, which is provided to a host computer 51 (hereinafter, host real VOL), and a real volume, which is not provided to a host computer 51 (hereinafter, non-host real VOL).

As a host real VOL, there is a primary real volume, which is the replication source in replication storage, which will be explained hereinbelow (hereinafter, real PVOL), and a secondary logical volume, which is the replication destination in this replication (hereinafter, replication real SVOL). Hereinafter, the respective storage areas constituting a real VOL will be called "real areas".

As a non-host real VOL, there is a logical volume, which is a constituent element of a pool (hereinafter, pool VOL). Hereinafter, a real area constituting a pool VOL will be called a "pool area".

As the virtual volume 241, there is a virtual volume the storage capacity of which is dynamically expanded via the Thin Provisioning technique (hereinafter, expanded-capacity VOL), a virtual volume corresponding to a real volume (hereinafter, external real VOL) 700 in the external storage system 70 (hereinafter, internal virtual VOL), and a secondary logical volume in the below-described quick snapshot (hereinafter QS) storage or Copy On Write snapshot (hereinafter, COWS) storage (hereinafter, virtual SVOL). For example, upon receiving an I/O command specifying an expanded-capacity VOL, the CPU 21 allocates a pool area to the expanded-capacity VOL, and accesses this allocated pool area. Further, for example, upon receiving an I/O command specifying an internal virtual VOL, the CPU 21 sends an I/O command, which specifies the external real VOL 700 correspondent to this internal virtual VOL, to the external storage system 70. Hereinafter, the respective storage areas constituting a virtual VOL will be called "virtual areas".

In the virtual storage system 100A, storage systems 20A and 20B are connected by a dedicated communication line 44. Commands and data are sent over this communication line 44. Furthermore, when the configuration lacks a communication line 44, the storage systems 20A and 20B can send and receive commands and data via a host computer 51.

FC I/F 25 controls the transmission of commands and data through the SAN 43 between the storage system 20A and the external storage system 70. FC I/F 26 controls the transmission of commands and data through the SAN 41 between the storage system 20A and a host computer 51. As the protocol for communications via SAN 41 and SAN 43, for example, the fibre channel protocol or iSCSI protocol can be used. Furthermore, FC I/F 25 and external storage system 70 can also be connected directly via an optical fibre cable or the like instead of SAN 43.

LAN I/F 27 is connected to the management device 50 by way of the management network 40. The management device 50, for example, is a computer comprising a CPU and a memory, and can manage the creation of a logical volume inside a virtual storage system 100, the allocation of a logical volume to a host computer 51, and the configuration of a logical path between a host computer 51 and a virtual storage system 100 (LUN masking, zoning, and so forth).

The preceding is an explanation of an example of the overall configuration of the system of this embodiment. Furthermore, according to this configuration example, the system for configuring information from the management device 50 to the respective storage system 20 is a so-called outbound system (a system in which the communication network (management network 40) via which commands go from the management device 50 to the respective storage systems 20 differs from the communication network (SAN 41, 42) via which commands go from a host computer 51 to the respective storage systems 20), but an inbound system can be used instead of this outbound system. For example, if the configuration is such that the management device 50 transmits and receives management information to and from the respective storage systems 20 via the SAN 41, it becomes an inbound system. Further, the external storage system 70 can be done away with. The overall system can also be configured by either one of a mainframe system or an open system, or by a combination of these two.

The data storage mode implemented by the above-described virtual storage systems 100A, 100B is one of three types: "replication storage", "QS storage" or "COWS storage". Each type of data storage mode will be explained below. Furthermore, in the following explanation, a VOL pair for which replication storage is carried out will be referred to as a "replication pair", a VOL pair for which QS storage is carried out will be referred to as a "QS pair", and a VOL pair for which COWS storage is carried out will be referred to as a "COWS pair". Further, in the following explanation, data stored in one storage area constituting a logical volume will be referred to as a "data element".

<<Replication Storage>>

Figure 3A:
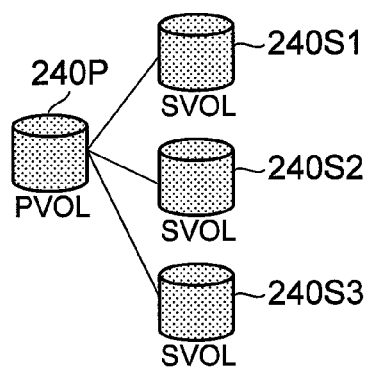
FIG. 3A is a schematic diagram of replication storage.

FIG. 3A is a schematic diagram of replication storage. Furthermore, three replication real SVOLs 240S1, 240S2, 240S3 respectively corresponding to a first-through a third-generation backup are shown in FIG. 3A, and replication real SVOL 240S1 will be given as an example and explained hereinbelow.

All the data elements stored in the real PVOL 240P constituting a replication pair are replicated in the replication real SVOL 240S1 constituting this replication pair. More specifically, for one replication pair, a difference bitmap, which is configured from a plurality of bits respectively corresponding to a plurality of real areas constituting the real PVOL 240P, is prepared. Data elements, which are stored in real areas corresponding to bits representing differences (bits in the difference bitmap (for example, '1')), are copied to real areas in the replication real SVOL 240S1 in order from the leading real area of the real PVOL 240P. Each time the copying of a data element is complete, the bit corresponding to the real area storing this data element (a bit in the difference bitmap) is updated to a value representing no difference (for example, the bit is updated from '1' to '0'). When the copying of all the data elements stored in the real PVOL is complete, the replication pair comprising this real PVOL is logically split (for example, the pair state is updated to 'split'). In a state in which a pair is logically split, the replication real SVOL is not updated even if a new data element is written to a certain real area in the real PVOL (However, the bit corresponding to this certain real area in the difference bitmap is updated to the value '1', which represents a difference.).

Figure 4A:
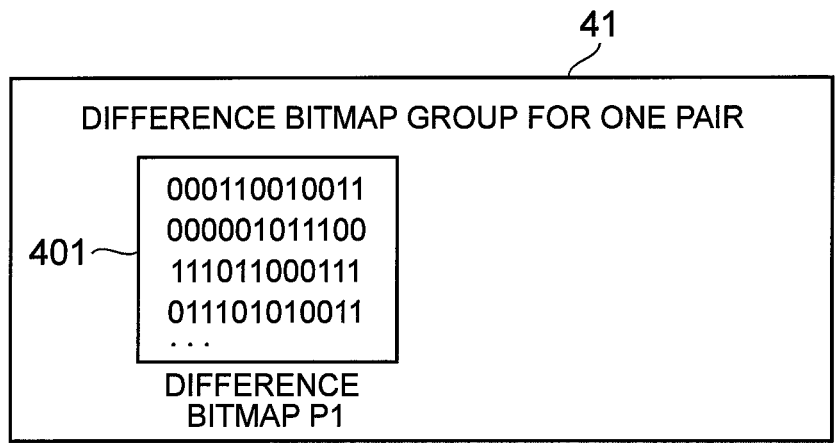
FIG. 4A shows an example of a difference bitmap group.

FIG. 4A shows an example of a difference bitmap. A difference bitmap group 41 for a single replication pair, for example, comprises one difference bitmap 401. A '0' bit in the difference bitmap 401 represents a location for which copying from the real PVOL to the replication real SVOL has ended (that is, a no difference real area), and a '1' bit represents a location for which this copying has not ended (that is, a difference real area) (at least one of the PVOL or SVOL can be a virtual VOL). Respective real areas of a predetermined size correspond to the respective bits constituting the difference bitmap 401. For example, when even a part of a certain real area has been updated, the bit corresponding to this real area is updated from '0' to '1'.

Figure 4B:
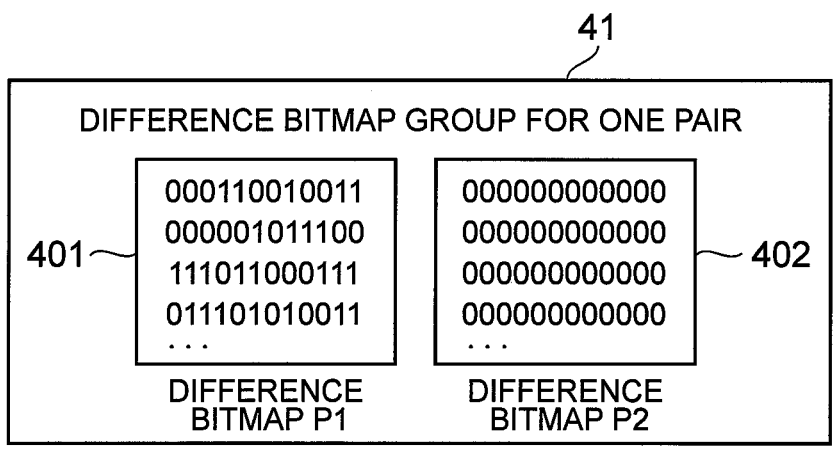
FIG. 4B shows another example of a difference bitmap group.

FIG. 4A shows an example in which one difference bitmap is prepared for one replication pair, but as shown in FIG. 4B, two difference bitmaps of the same size can be prepared for a single replication pair. When two bitmaps are used, for example, replication storage is carried out in accordance with the following flow.

A process in which all of the data elements stored in the real PVOL 240P are initially copied to the replication real SVOL 240S1 will be called an "initial copy" hereinbelow. In an initial copy, the CPU 21 changes all the bits constituting an initial copy difference bitmap (hereinafter, abbreviated as "initial BM") 403 to '1'. In an initial copy, upon detecting a '1' bit from the initial BM 403, the CPU 21 makes a determination as to whether or not the data element stored in the real area corresponding to this '1' bit is stored in the cache memory (a portion of the memory 22 shown in FIG. 1). If the data element is not stored in the cache memory, the CPU 21 reads the data element from the real PVOL 240P, writes this data element to the cache memory, and creates a copy of this data element in the cache memory. Then, the CPU 21 creates new redundancy information (for example, parity data) for determining whether or not this data element is correct, and attaches this redundancy information to the replication of the data element. When the CPU 21 writes the data element to the cache memory, the CPU 21 updates the relevant bit of the initial BM 403 (the bit corresponding to the real area of the read source) from '1' to '0'. The CPU 21 repeats the above-described process until all the bits in the initial BM 403 become '0'. Furthermore, a method, in which redundancy information for the replication real SVOL 240S1 is created, and this redundancy information is stored in the cache memory as a replication real SVOL 240S1 data element when reading a data element from the real PVOL 240P, can also be employed. Further, for example, a method, in which the replication real SVOL 240S1 data element in cache memory is written to the replication real SVOL 240S1 at asynchronous timing to the reading out of a data element from the real PVOL 240P to the cache memory, can also be used.

When the above-mentioned initial copy has ended, the differences between the pair comprising the real PVOL 240P and the replication real SVOL 240S1 cease to exist. In other words, immediately subsequent to the end of an initial copy, the state of this replication pair becomes 'pair synchronous'. By virtue of the CPU 21 updating this pair status from 'pair synchronous' to 'split' at an arbitrary time, the replication real SVOL 240S1 becomes a backup for the real PVOL 240P at this arbitrary time.

Furthermore, when there are no differences in the replication pair, the pair status is updated to "asynchronous", and, for example, upon receiving a split request from a host computer 51, the CPU 21 can report split-complete to the host computer 51 even when an initial copy is in the process of being executed (that is, while differences are occurring in the pair). In this case, the CPU 21 makes joint use of the initial BM 403 and the difference bitmap 402 for the differential copy (the difference bitmap for managing a difference subsequent to a pair state having been split will be abbreviated as "update BM" hereinafter). For example, when a new data element is written to a certain real area of the real PVOL 240P after split-complete has been reported, the CPU 21 updates the bit in the update BM 402, which corresponds to this real area, to '1'. Upon receiving a copy request from a host computer 51 either during an initial copy or subsequent to the end of an initial copy, if the CPU 21 detects a '1' bit from the update BM 402, the CPU 21 copies the data element stored in the real area (real area in the real PVOL) corresponding to this '1' bit to the replication real SVOL 240S1. That is, a so-called differential copy is carried out.

<<QS Storage>>

Figure 3B:
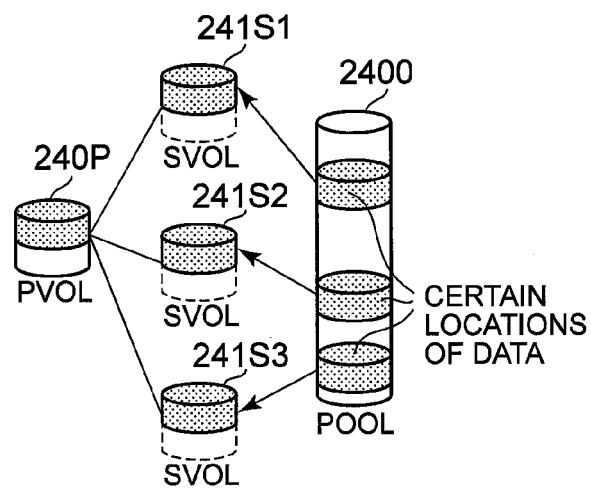
FIG. 3B is a schematic diagram of QS storage.

FIG. 3B is a schematic diagram of QS storage. Furthermore, three virtual SVOLs 241S1, 241S2, 241S3 respectively corresponding to a first- through a third-generation snapshot are shown in FIG. 3B, and virtual SVOL 241S1 will be given as an example and explained hereinbelow.

In QS storage, a pool area of the virtual area (virtual area constituting the virtual SVOL 241S1) portion, which is the storage destination of a data element, is reserved from a pool 2400. In QS storage, an old data element is moved from the real PVOL 240P to the virtual SVOL 241S1 when a new data element is written to the real PVOL 240P without executing the initial copy in the replication storage. When a snapshot of the real PVOL 240P is acquired in a state in which a data element A is being stored in a certain real area of the real PVOL 240P, a data element B is written to this certain real area, and thereafter, when a data element C is written to this certain real area, pre-update data element A is written to the virtual SVOL 241S1, and the next pre-update data element B is written to data element C without being written to the virtual SVOL 241S1.

Figure 10A:
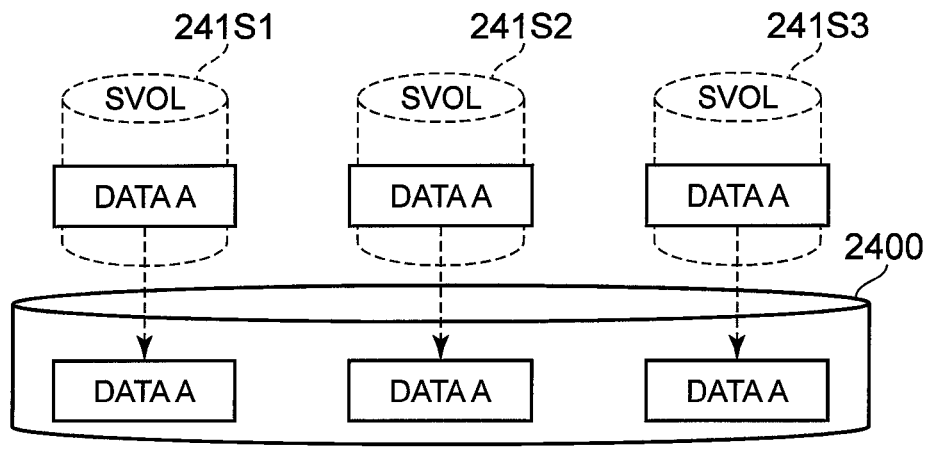
FIG. 10A shows an example of QS storage.

Further, for example, if there are three virtual SVOLs 241I, 241S2 and 241S3, when a certain real area of the real PVOL 240P is updated for the first time, a duplicate of the data element A stored in this certain real area is created, and the duplicate of data element A is stored in each of the three virtual SVOLs 241S1, 241S2, 241S3 (Refer to FIG. 10A). For this reason, duplicates of the three data elements A are stored in each of the three real areas in the pool 2400.

<<COWS Storage>>

Figure 3C:
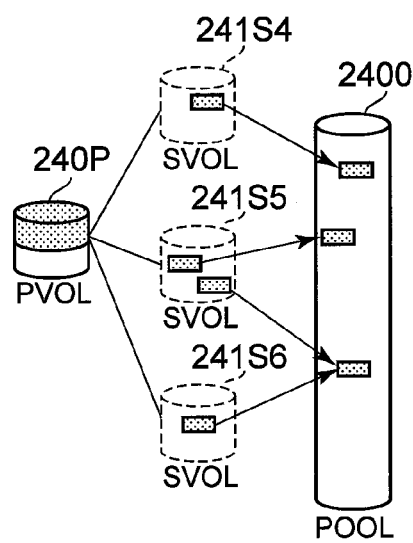
FIG. 3C is a schematic diagram of COWS storage.

FIG. 3C is a schematic diagram of COWS storage. Furthermore, three virtual SVOLs 241S4, 241S5, 241S6 respectively corresponding to a first- through a third-generation snapshot (backup) are shown in FIG. 3C, and virtual SVOL 241S4 will be given as an example and explained hereinbelow.

The fact that a pre-update data element of the real PVOL 240P is saved to the pool 2400 by way of the virtual SVOL 241S4 is a point shared in common with QS storage. However, COWS storage differs from QS storage in the first and second points described hereinbelow.

The first point is that all the pre-update data elements are saved to the pool 2400 no matter how many times a data element is updated in the same real area. More specifically, for example, data element B is written to a real area where data element A exists, and when data element C is also written to this real area, both data element A and data element B are saved to the pool 2400. However, this is a situation in which a snapshot acquisition indication is issued for each update, but if a snapshot acquisition indication is not issued, and the data is not being shared with the other VOL, the data is overwritten without being saved.

Figure 10B:
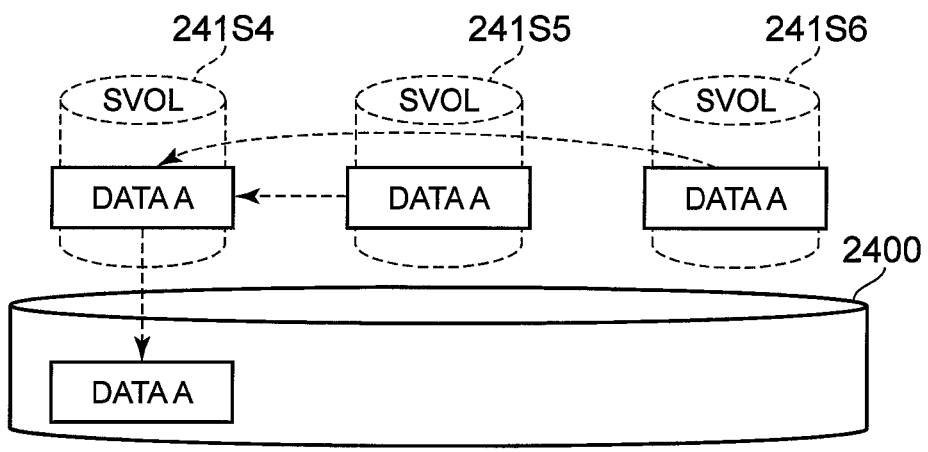
FIG. 10B shows an example of COWS storage.
Figure 10C:
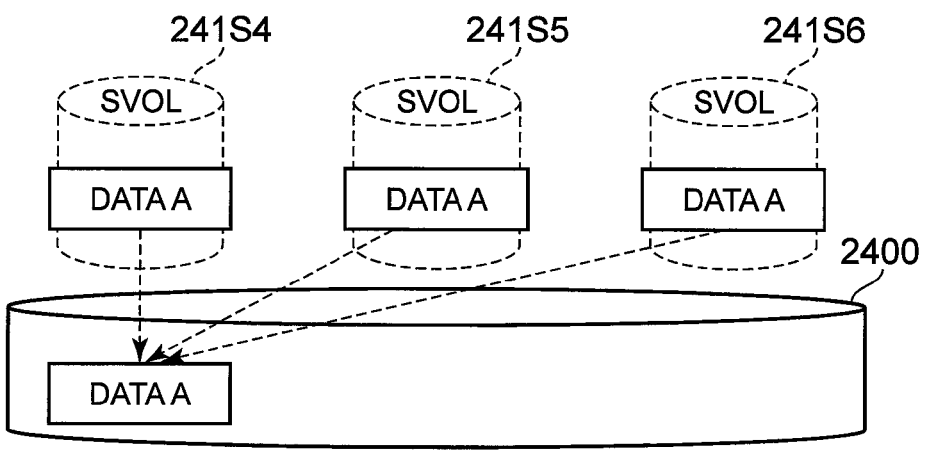
FIG. 10C shows another example of COWS storage.

The second point is that only one of a plurality of data elements mutually duplicated in a plurality of generations of virtual SVOLs 241S is stored in a pool area of the pool 2400, and this data element is referenced via the plurality of generations of virtual SVOLs 241S for the other data elements. More specifically, for example, when the same data element A is stored in the respective virtual areas (will be virtual areas 1, 2, 3 hereinafter) of the three virtual SVOLs 241S4, 241S5, and 241S6, either the virtual areas 1, 2, and 3 are made directly correspondent to the relevant pool area (area in which data element A is stored) in the pool 2400 (Refer to FIG. 10B), or only virtual area 1 is made directly correspondent to the relevant pool area, and the other virtual areas 2 and 3 are made correspondent to virtual area 1 (that is, virtual areas 1 and 2 are made indirectly correspondent to the relevant pool area) (Refer to FIG. 10C). In the case of the former, when read access is generated to the virtual areas 1, 2, and 3, read access is made to the relevant pool area, and in the case of the latter, when read access is generated to virtual areas 2 and 3, read access is made to the relevant pool area via virtual area 1.

The preceding is explanations of replication storage, QS storage and COWS storage. Furthermore, the pools respectively corresponding to QS storage, COWS storage and an expanded-capacity VOL can be either separate or shared. Further, the data storage mode used is not limited to the three types described above, and can be less than three types, or four or more types, and even if there are three types, these types to not have to be limited to the data storage modes described hereinabove. For example, it is possible to use a data storage mode, which is similar to COWS storage, but which is a type for saving a post-update data element to the pool 2400 instead of a pre-update data element, and for leaving the pre-update data element in the real PVOL 240P. Further, in any of the data storage modes described hereinabove, a PVOL can be a virtual volume (for example, an expanded-capacity VOL or an internal virtual VOL).

<<Computer Programs and Information Stored in Memory 22>>

Figure 17:
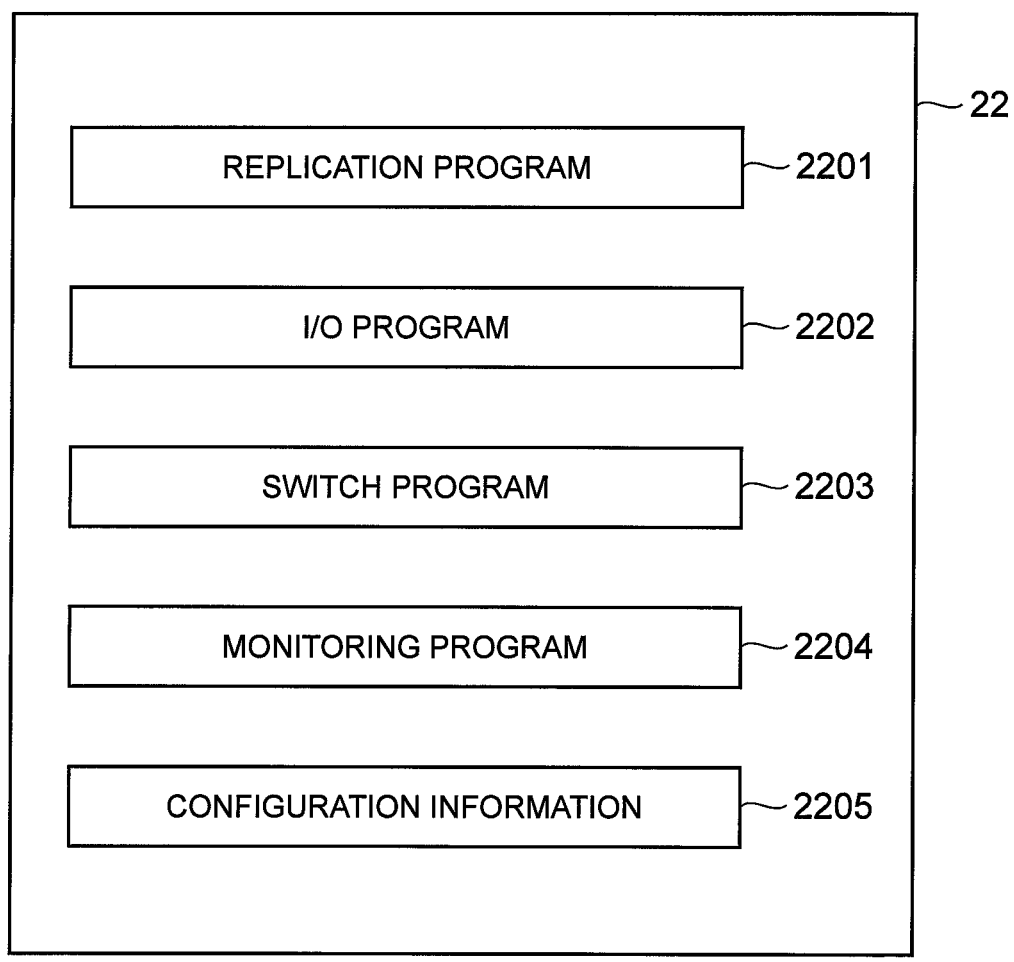
FIG. 17 shows an example of computer programs and information stored in memory.

FIG. 17 shows an example of computer programs and information stored in the memory 22.

As the computer programs, for example, there is a replication program 2201 for executing replication storage; an I/O program 2202 for controlling the I/O (input/output) corresponding to a logical volume; a switch program 2203 for carrying out the switching of data storage modes; and a monitoring program 2204 for carrying out prescribed monitoring. The monitoring program 2204 can be executed by the management device 50 instead of by a storage system 20.

As the information, for example, there is configuration information 2205 for managing the logical volume and type of data storage mode. The configuration information 2205, for example, comprises a VOL management table, a virtual mapping table, and a pool area management table.

FIG. 18 shows an example of the configuration of a VOL management table 22051.

A VOL number (for example, a LUN), a VOL type, a data storage mode type, a pair-partner VOL number, and a pair status are recorded in the VOL management table 22051 for each logical volume. As the VOL type, for example, there is a real VOL or a virtual VOL, any of a PVOL, SVOL, pool VOL, or external real VOL, and in the case of a PVOL that is a virtual VOL, there is either of an expanded-capacity VOL or an internal virtual VOL.

The I/O program 2202, for example, upon receiving an I/O command from a host computer 51, references the row corresponding to the LUN specified by this I/O command (the row in the VOL management table 22051). The I/O program 2202 controls access in accordance with the VOL type corresponding to this LUN, and the data storage mode type.

Figure 9A:
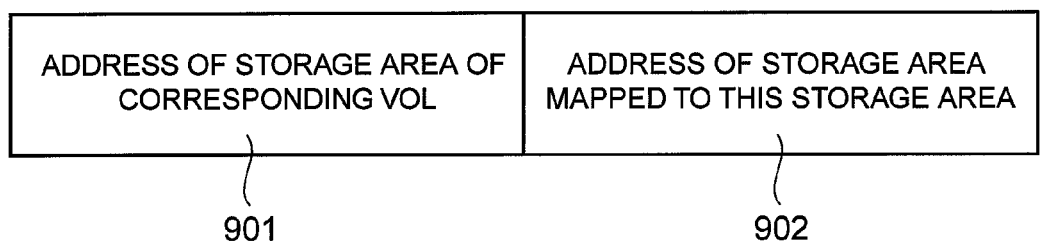
FIG. 9A shows an example of the configuration of one record of an area mapping table.

FIG. 9A shows an example of the configuration of one record of the area mapping table 910.

The area mapping table 910 corresponds to each VOL (for example, a virtual SVOL, or a virtual SVOL called an expanded-capacity VOL). The respective records (rows) of the area mapping table 910 correspond to the storage area in the corresponding VOL (for example, the virtual area in a virtual VOL). The address 901 of the storage area corresponding to this record, and the address 902 of the storage area made correspondent to this storage area (for example, a real area in a PVOL or the pool 2400).

Figure 9B:
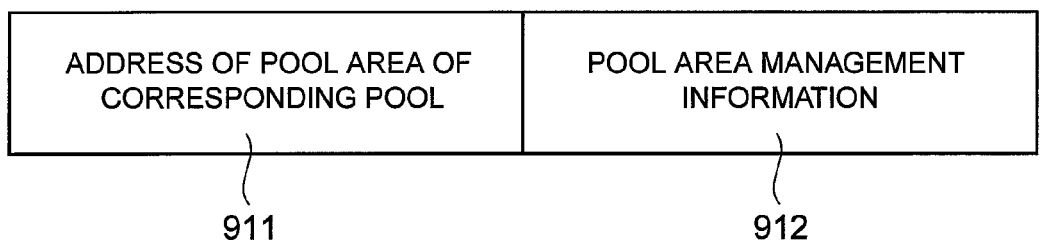
FIG. 9B shows an example of the configuration of one record of a pool area management table.

FIG. 9B shows an example of the configuration of a record in the pool area management table 920.

The pool area management table 920 corresponds to each pool 2400. The respective records (rows) of the pool area management table 920 correspond to the respective pool areas in the corresponding pool. The record records the address 911 of the pool area corresponding to this record, and information related to this pool area (hereinafter, pool area management information) 912. The pool area address 911, for example, is expressed by combining a pool VOL ID with information representing a location in this pool VOL. Pool area management information 912, for example, comprises the number of virtual areas correspondent to the corresponding pool area, and the status related to this pool area (for example, allocated, allocateable, and so forth).

<<Data Storage Mode Switch>>

FIG. 2 shows an example of the step-by-step switching of a data storage mode.

The monitoring program 2204 is started. The monitoring program 2204 can be started up on a regular basis, or the receiving of a prescribed command from a host computer 51 can trigger startup. For example, the monitoring program 2204 can be started up at the timing of the arrival of either a write command or read command specifying either a PVOL or a SVOL.

The monitoring program 2204 carries out a first determination for a plurality of replication pairs. As the first determination, for example, at least one of the following (First Determination 1), (First Determination 2) or (First Determination 3) is carried out.

(First Determination 1) What is the total amount of duplicated data elements in no less than two replication real SVOLs out of the plurality of replication real SVOLs in the plurality of replication pairs?

(First Determination 2) What is the access frequency of each of the plurality of replication real SVOLs in the plurality of replication pairs?

(First Determination 3) What is the consumption/capacity ratio of a replication real SVOL (How many data elements are actually stored in the storage capacity of the replication real SVOL?)?

When at least one of the following determination results (11a), (12a), or (13a) is obtained in the first determination, the monitoring program 2204 causes the switch program 2203 to execute a switch from replication storage to QS storage (Arrow 201). Consequently, the data inside the respective replication real SVOLs is stored in a pool area by way of the respective virtual SVOLs.

(11a) In the (First Determination 1), the total amount of duplicate data elements is greater than a first threshold but less than a second threshold (first threshold<second threshold).

(12a) In the (First Determination 2), the access frequency for a prescribed number of replication real SVOLs is greater than a third threshold but less than a fourth threshold (third threshold<fourth threshold).

(13a) In the (First Determination 3), the consumption/capacity ratio of a replication real SVOL is less than a fifth threshold.

When at least one of the following determination results (11b), (12b), or the above-mentioned (13a) is obtained in the first determination, the monitoring program 2204 causes the switch program 2203 to execute a switch from replication storage to COWS storage.

(11b) In the (First Determination 1), the total amount of duplicate data elements is greater than a second threshold.

(12b) In the (First Determination 2), the access frequency for a prescribed number of replication real SVOLs is less than a third threshold.

When none of the above-described determination results is obtained in the above-mentioned first determination, the replication real SVOLs of the replication storage are saved as-is.

The monitoring program 2204 carries out a second determination for a plurality of QS pairs. As the second determination, for example, the following (Second Determination 1) and/or (Second Determination 2) are carried out.

(Second Determination 1) What is the total amount of duplicated data elements in no less than two virtual SVOLs of the plurality of virtual SVOLs in the plurality of QS pairs?

(Second Determination 2) What is the access frequency of each of the plurality of virtual SVOLs in the plurality of QS pairs?

When the following determination results (21a) and/or (22a) is obtained in the second determination, the monitoring program 2204 causes the switch program 2203 to execute a switch from QS storage to COWS storage (Arrow 203). Consequently, when the plurality of data elements respectively stored in the plurality of virtual SVOLs duplicate one another, the pool area in which one data element of this plurality of data elements is stored is directly or indirectly mapped to the virtual areas where this data element exists in the plurality of virtual SVOLs. The pool area in which the other data elements of the plurality of mutually duplicated data elements exist is deemed an unused pool area, and therefore this pool area can be used for storing the other data elements.

(21a) In the (Second Determination 1), the total amount of duplicated data elements is greater than a second threshold.

(22a) In the (Second Determination 2), the access frequency of the prescribed number of virtual SVOLs is less than a third threshold.

When the following determination result (22b) is obtained in the second determination, the monitoring program 2204 causes the switch program 2203 to execute a switch from QS storage to replication storage (Arrow 208).

(22b) In the (Second Determination 2), the access frequency of the prescribed number of virtual SVOLs is greater than a fourth threshold.

The monitoring program 2204 carries out a third determination for a plurality of COWS pairs. The third determination, for example, determines the respective access frequencies of the plurality of virtual SVOLs.

When the determination result obtained in the third determination is that the access frequencies for the prescribed number of virtual SVOLs are greater than a third threshold but less than a fourth threshold, the monitoring program 2204 causes the switch program 2203 to execute a switch from COWS storage to QS storage (Arrow 206).

When the determination result obtained in the third determination is that the access frequencies for the prescribed number of virtual SVOLs are greater than the fourth threshold, the monitoring program 2204 causes the switch program 2203 to execute a switch from COWS storage to replication storage (Arrow 207).

The preceding is an overview of the step-by-step switch flow for the data storage modes. Furthermore, in the above-mentioned flow, in switching from replication storage to QS storage or COWS storage, from QS storage to COWS storage or replication storage, and from COWS storage to QS storage or replication storage, a switch from a real PVOL to an expanded-capacity VOL can be carried out in accordance with the total amount of 0 data elements. More specifically, for example, the monitoring program 2204 determines in the respective first determination, second determination, and third determination whether or not the ratio of data elements, for which all the data blocks constituting a data element are '0' (hereinafter, "data element 0"), accounting for real PVOLs is greater than a prescribed value, and if this ratio is greater than the prescribed value, carries out a switch from the real PVOL to an expanded-capacity VOL (Arrows 202, 205, 211, 212, 213, 214), and if this ratio is less than the prescribed value, does not carry out a switch from the real PVOL to the expanded-capacity VOL (Arrows 201, 204, 203, 206, 207, 208).

As for the capacity efficiency of each of the three types of data storage modes described above (the consumption efficiency of the storage capacity), COWS storage capacity efficiency is the best, followed by QS storage capacity efficiency, which is good, and replication storage capacity efficiency, which is the worst. This is because, in replication storage, it is not possible to use the free storage capacity in a replication real SVOL as the copy destination for a data element stored in other logical volumes, in QS storage, a pool area proportional to the size of a virtual area actually utilized in a virtual SVOL is used, and in COWS storage, if a plurality of data elements, which exist in a plurality of virtual SVOLs, duplicate one another, only a pool area for one data element of these data elements is utilized, and the other pool areas are treated as unused.

Conversely, as for the access performance (I/O speed) for each of the SVOLs of the above-mentioned three types of backup, access performance is highest for SVOLs in replication storage, followed by the access performance of SVOLs in QS storage, which is high, and the access performance of SVOLs in COWS storage, which is the lowest. This is because, in COWS storage, generating access to a plurality of virtual areas that exist in the plurality of virtual SVOLs will run the risk of focusing access on a single pool area, in QS storage, a particular process for referencing the area mapping table, which denotes what pool area has been allocated to what virtual area, is required, and in replication storage, access is carried out without referring to the area mapping table.

In this embodiment, switching is carried out from replication storage to QS storage, from replication storage to COWS storage, or from QS storage to COWS storage in accordance with at least one of the total amount of duplicated data elements, the SVOL access frequency, or the consumption/capacity ratio of the replication real SVOL. Further, switching is carried out from COWS storage to QS storage, from COWS storage to replication storage, or from QS storage to replication storage in accordance with at least one of the total amount of duplicated data elements, the SVOL access frequency, or the consumption/capacity ratio of the replication real SVOL. Consequently, it is possible to enhance the capacity efficiency and performance of the storage system.

Furthermore, in a data storage mode switch, there is a method for switching data storage modes after creating a replica (backup) of a pre-switch SVOL (either a replication real SVOL or a virtual SVOL), and a method for carrying out a switch process online as-is without making a replica.

The respective kinds of data storage mode switchovers will be explained in detail hereinbelow.

<<Arrow 201 of FIG. 2: Switching from Replication Storage to QS Storage>>

Figure 5:
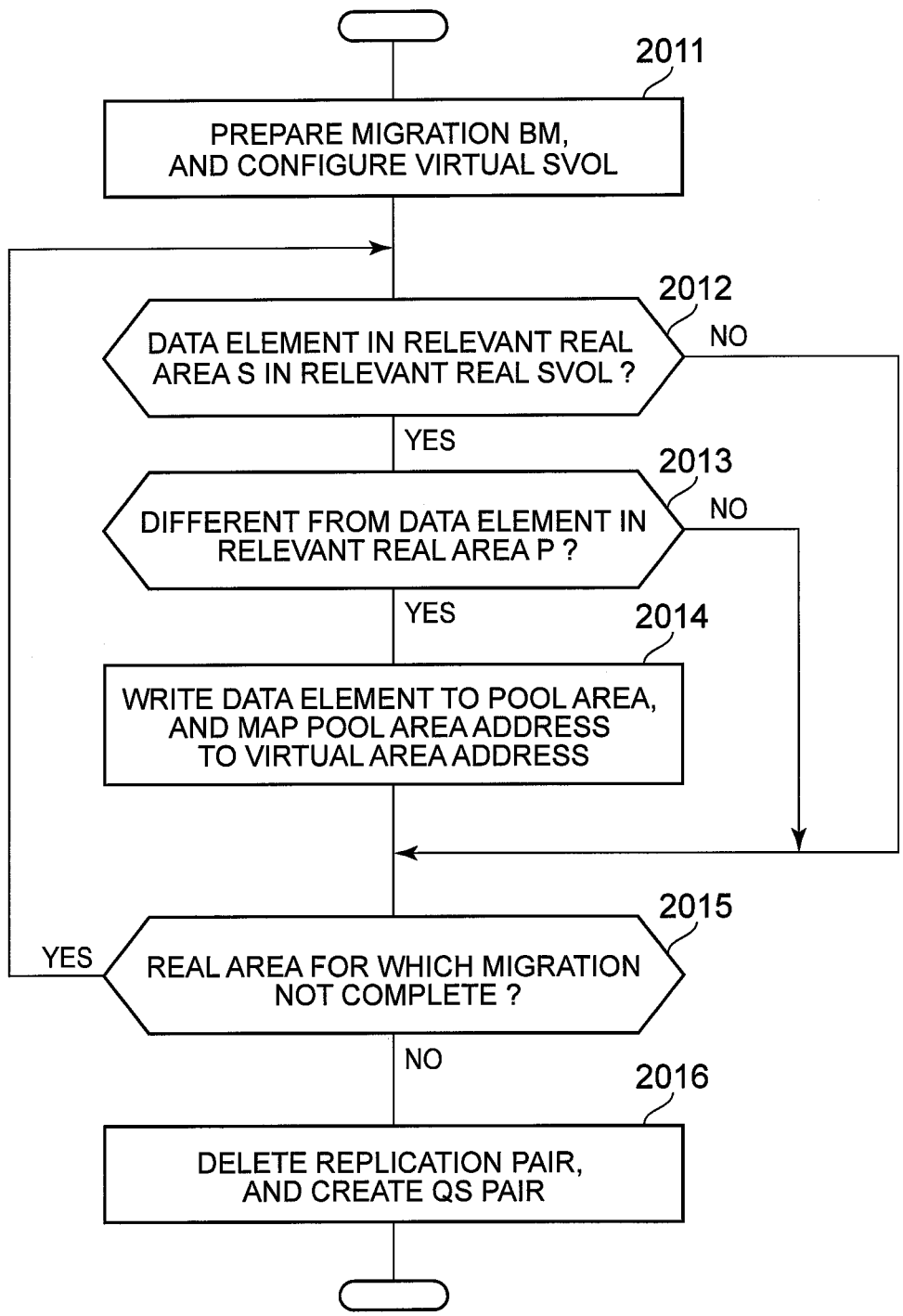
FIG. 5 shows an example of the flow of processing for switching from replication storage to QS storage.

FIG. 5 shows an example of the flow of processing of a switch from replication storage to QS storage. In the explanations of FIG. 5, FIG. 7, FIG. 13 and FIG. 15, the replication real SVOL, which is the switch source, will be called the "relevant replication real SVOL", the real PVOL constituting a pair with the relevant replication real SVOL will be called the "relevant real PVOL", and the virtual SVOL, which is the switch destination, will be called the "relevant virtual SVOL".

In Step 2011, switch program 2203 prepares a difference bitmap for migrating all bits to a prescribed value (for example, to 0) (hereinafter, migration BM), and sets the number denoting the location of the leading bit in this migration BM as the count value (The respective bits of the migration BM (hereinafter, migration bits) correspond to the respective real areas of the relevant replication real SVOL.). Further, the switch program 2203 configures the relevant virtual SVOL corresponding to the relevant replication real SVOL (For example, in the volume management table 22051 of FIG. 18, configures the new record corresponding to the relevant virtual SVOL). Further, the switch program 2203 also prepares an area mapping table 910 corresponding to the relevant virtual SVOL. At this time, the switch program 2203 can also record the addresses of the respective real areas in the relevant real PVOL as respective corresponding area addresses 902, which correspond to the respective virtual areas in the area mapping table 910 (virtual areas constituting the relevant virtual SVOL). This area mapping table 910 is updated accordingly in Step 2014.

In Step 2012, the switch program 2203 determines whether or not a data element is stored in the real area corresponding to the migration bit shown by the count value (Hereinafter, in the explanation of this FIG. 5, the real area in the relevant replication real SVOL will be referred to as the "relevant real area S"). If a data element is stored in the relevant real area S, Step 2013 is executed, and if a data element is not stored in the relevant real area S, Step 2015 is executed.

In Step 2013, the switch program 2203 determines whether or not the data element stored in the relevant real area S duplicates the data element stored in the real area in the relevant real PVOL (hereinafter, in this explanation of FIG. 5, the real area, which is in the location corresponding to the relevant real area, will be referred to as the "relevant real area P"). If the determination result is that there is no duplication, Step 2014 is executed, and if the determination result is that there is duplication, Step 2015 is executed.

In Step 2014, the switch program 2203 allocates an unused pool area (hereinafter, in this explanation of FIG. 5, will be referred to as the "relevant pool area") to the virtual area corresponding to the relevant real area S (hereinafter, in this explanation of FIG. 5, will be referred to as the "relevant virtual area"). The switch program 2203 copies the data element stored in the relevant real area S to the relevant pool area. The switch program 2203 makes the relevant pool area correspondent to the relevant virtual area. More specifically, for example, the switch program 2203 registers the address 901 of the relevant virtual area and the address 902 of the relevant pool area in the area mapping table 910 corresponding to the relevant virtual SVOL (refer to FIG. 9A).

In Step 2015, the switch program 2203 increments the above-mentioned count value, and determines whether or not the post-increment count value is a prescribed value (for example, the number of bits constituting the migration BM). If the count value is not the prescribed value, the switch program 2203 executes Step 2012, and if the count value is the prescribed value, the switch program 2203 executes Step 2017.

In Step 2016, the switch program 2203 deletes the pair, which has the relevant replication real SVOL as a component, and creates a pair from the relevant PVOL and relevant virtual SVOL as a pair for which QS storage is carried out. More specifically, for example, the switch program 2203 deletes, in a volume management table 22051, the VOL number of the relevant replication real SVOL from the pair-partner VOL number corresponding to the relevant real PVOL. Also, for example, the switch program 2203 configures a value, which includes the VOL number of the relevant virtual SVOL in the pair-partner VOL number corresponding to the relevant real PVOL, and denotes QS storage as the data storage mode corresponding to the relevant real PVOL. Similarly, for example, the switch program 2203 configures a value, which includes the VOL number of the relevant real PVOL in the pair-partner VOL number corresponding to the relevant virtual SVOL, and denotes QS storages as the data storage mode corresponding to the relevant virtual SVOL.

Detailed examples of the processing carried out in Steps 2012 and 2013 of FIG. 5 will be explained hereinbelow. In Steps 2012 and 2013, either a difference bitmap is used, or a comparison of data elements is carried out. Hereinafter, a certain bit in the initial BM 403 will be referred to as the "relevant initial bit", and the bit in the update BM 402, which corresponds to the relevant initial bit, will be referred to as the "relevant update bit". Further, a real area in the real PVOL, which corresponds to the relevant initial bit (and relevant update bit) will be referred to as the "relevant real area P", and the real area in the replication real SVOL, which corresponds to the relevant real area P, will be referred to as the "relevant real area S".

<<Detailed Example of Processing Carried Out in Step 2012 of FIG. 5>>

When the relevant initial bit is '1', the switch program 2203 determines that the data element does not exist in the relevant real area S because the initial copy for the relevant real area P was not implemented, and when the relevant initial bit is '0', the switch program 2203 determines that the data element is in the relevant real area S because the initial copy has been implemented.

<<Detailed Example of Processing Carried Out in Step 2013 of FIG. 5>>

When both the relevant initial bit and relevant update bit are '0', the switch program 2203 determines that the data element in the relevant real area P and the data element in the relevant real area S duplicate one another (that is, Step 2015 will be executed), and by contrast, if the relevant initial bit is '0', and the relevant update bit is '1', the switch program 2203 determines that these data elements do not duplicate one another (that is, Step 2014 will be executed). Or, for example, the switch program 2203 reads the respective data elements from the relevant real area P and relevant real area S, and determines whether or not these two data elements duplicate one another by collating the two read data elements. If the data elements duplicate one another, Step 2015 is executed, and if the data elements do not duplicate one another, Step 2014 is executed.

However, if I/O is prohibited for any of the relevant real PVOL, relevant replication real SVOL, or relevant virtual SVOL while data storage mode switching is in progress (for example, if a busy or retry response is returned even when an I/O command specifying any one of these VOLs has been received), the I/O program 2202 can prevent a data element in a VOL from being updated while data storage mode switching is in progress.

However, if I/O is prohibited like this, it is possible that a job being carried out by a host computer 51 will be stopped temporarily.

Accordingly, in this embodiment, when an I/O command is accepted from a host computer 51, and the I/O command is received even though data storage mode switching is in progress, the I/O program 2202 executes the processing for this I/O command. Furthermore, the I/O program 2202 can determine whether or not a data storage mode switch is in progress, for example, by referring to the switch management table (not shown in the figure) recorded in the memory 22. When executing a data storage mode switch, the switch program 2203, for example, registers in the switch management table information denoting that it is in the midst of executing a switch from what data storage mode to what data storage mode for a pair comprising what PVOL and what SVOL (for example, information comprising information denoting the VOL number of the PVOL, the VOL number of the SVOL, and the data storage mode), and deletes this registered information from the switch management table when the switch ends.

Accordingly, I/O processing in the midst of a data storage mode switch will be explained hereinbelow.

<<I/O Processing while Switching from Replication Storage to QS Storage>>

Figure 13:
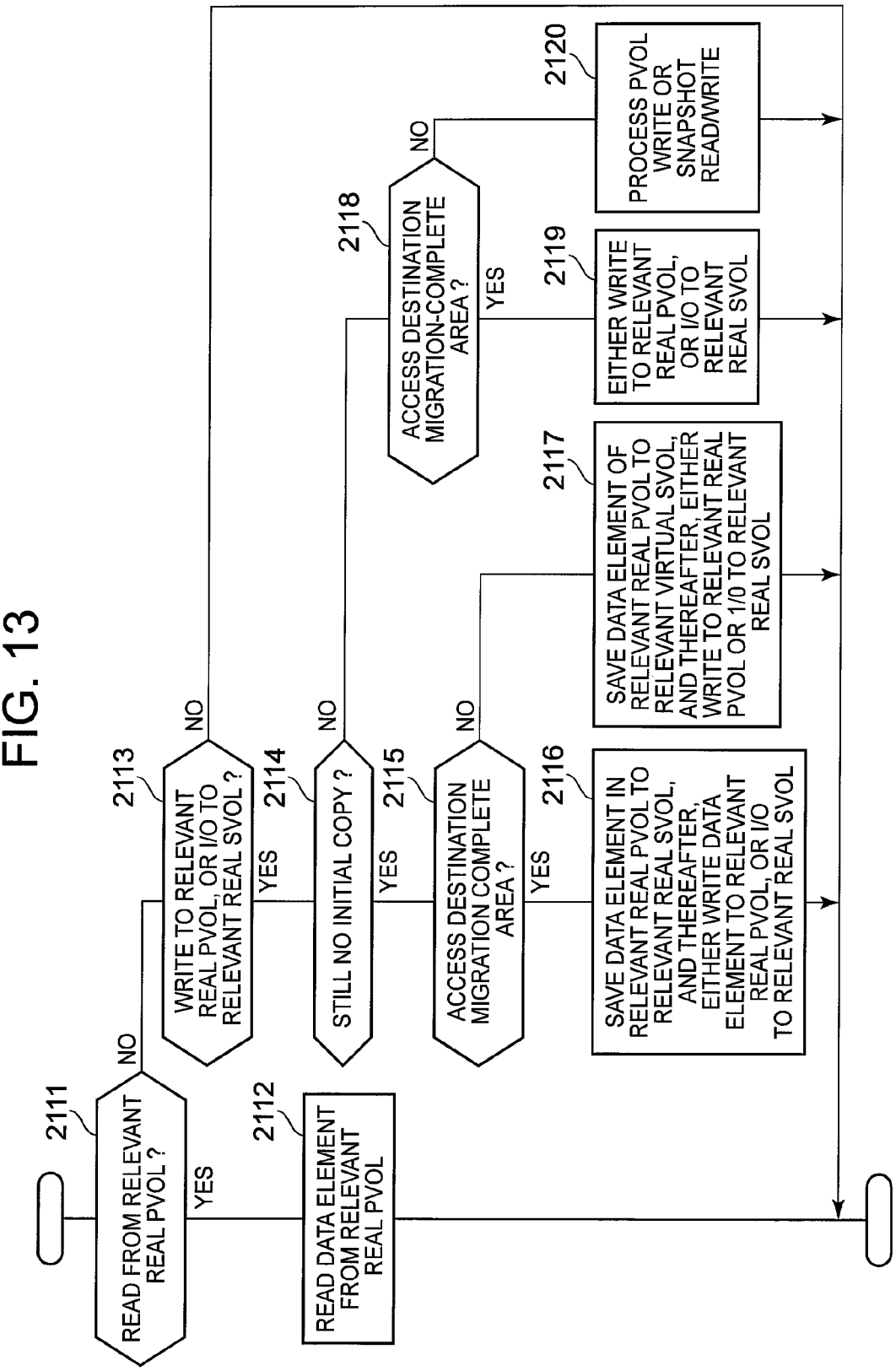
FIG. 13 shows the flow of processing executed when an I/O command is received from a host computer while switching from replication storage to QS storage.

FIG. 13 shows the flow of processing executed when an I/O command is received from host computer 51A while switching from replication storage to QS storage. In the explanation, which refers to FIG. 13 (and FIG. 15), a real area in the relevant real PVOL, which is specified in the I/O command, will be referred to as the "specified real area P", and a real area in the relevant replication real SVOL, which is specified in the I/O command, will be referred to as the "specified real area S". Further, a real area, which is in the relevant replication real SVOL, and which is in a location corresponding to the specified real area P, will be referred to as the "corresponding real area S", and a real area, which is in the relevant real PVOL, and which is in a location corresponding to the specified real area S, will be referred to as the "corresponding real area P". Further, a data element targeted by a read, which conforms to a read command, will be referred to as the "read-targeted data element", and a data element targeted by a write, which conforms to a write command, will be referred to as the "write-targeted data element".

The I/O program 2202 determines if the received I/O command is a read command specifying the relevant real PVOL (Step 2111).

In Step 2111, if the determination is that the received I/O command is a read command, the I/O program 2202 reads the read-targeted data element from the specified real area P specified by the read command, and sends this read-targeted data element to host computer 51A.

In Step 2111, if the determination result is that the received I/O command is not a read command, the I/O program 2202 determines if the received I/O command is either a write command specifying the relevant real PVOL, or an I/O command specifying the relevant replication real SVOL (Step S2113). If the determination result is that the received I/O command is such a write command or I/O command, Step 2114 and subsequent steps are executed.

If the initial copy from the specified real area P, or the initial copy to the specified real area S is not finished (Step 2114: YES), and the count value for the migration BM is less than the number denoting the location of the migration bit corresponding to the specified real area P or specified real area S, (that is, if the migration of the data element from the specified real area S or corresponding real area S to a virtual SVOL is not complete) (Step 2115: YES), the I/O program 2202 executes Step 2116. In Step 2116, the I/O program 2202 copies the data element, which is in the specified real area P or the corresponding real area P to the corresponding real area S or specified real area S, and thereafter, writes the write-targeted data element to either the specified real area P or specified real area S, or reads the read-targeted data from the specified real area S. Thereafter, the I/O program 2202 updates the initial bit corresponding to the specified real area P or the specified real area S to '0', and updates the migration bit and update bit corresponding to the specified real area P or the specified real area S to '1'.

If the initial copy from the specified real area P, or the initial copy to the specified real area S is not finished (Step 2114: YES), and the count value for the migration BM is greater than the number denoting the location of the migration bit corresponding to the specified real area P or specified real area S, (that is, if the migration of the data element from the specified real area S or corresponding real area S to a virtual SVOL is finished) (Step 2115: NO), the I/O program 2202 executes Step 2117. In Step 2117, the I/O program 2202 copies the data element, which is in the specified real area P or the corresponding real area P to the virtual area (actually, to a pool area allocated to this virtual area) in the relevant virtual SVOL, which corresponds to the corresponding real area S or specified real area S, and thereafter, writes the write-targeted data element to either the specified real area P or copy-destination virtual area, or reads the read-targeted data from this virtual area.

If the initial copy from the specified real area P, or the initial copy to the specified real area S is finished (Step 2114: NO), and the count value for the migration BM is less than the number denoting the location of the migration bit corresponding to the specified real area P or specified real area S (Step 2118: YES), the I/O program 2202 executes Step 2119. In Step 2119, the I/O program 2202 reads the read-targeted data from the specified real area S, or writes the write-targeted data element to either the specified real area P or specified real area S, and updates the migration bit and update bit corresponding to either the specified real area P or specified real area S to '1'.

If the initial copy from the specified real area P, or the initial copy to the specified real area S is finished (Step 2114: NO), and the count value for the migration BM is greater than the number denoting the location of the migration bit corresponding to the specified real area P or specified real area S (Step 2118: NO), the I/O program 2202 executes Step 2120. In Step 2120, the I/O program 2202 reads the read-targeted data from the virtual area corresponding to the specified real area S, or writes the write-targeted data element to the specified real area P (or the virtual area corresponding to the specified real area S), and updates the migration bit and update bit corresponding to either the specified real area P or specified real area S to '1'.

<<Arrow 203 of FIG. 2: Switch from QS Storage to COWS Storage>>

Figure 6:
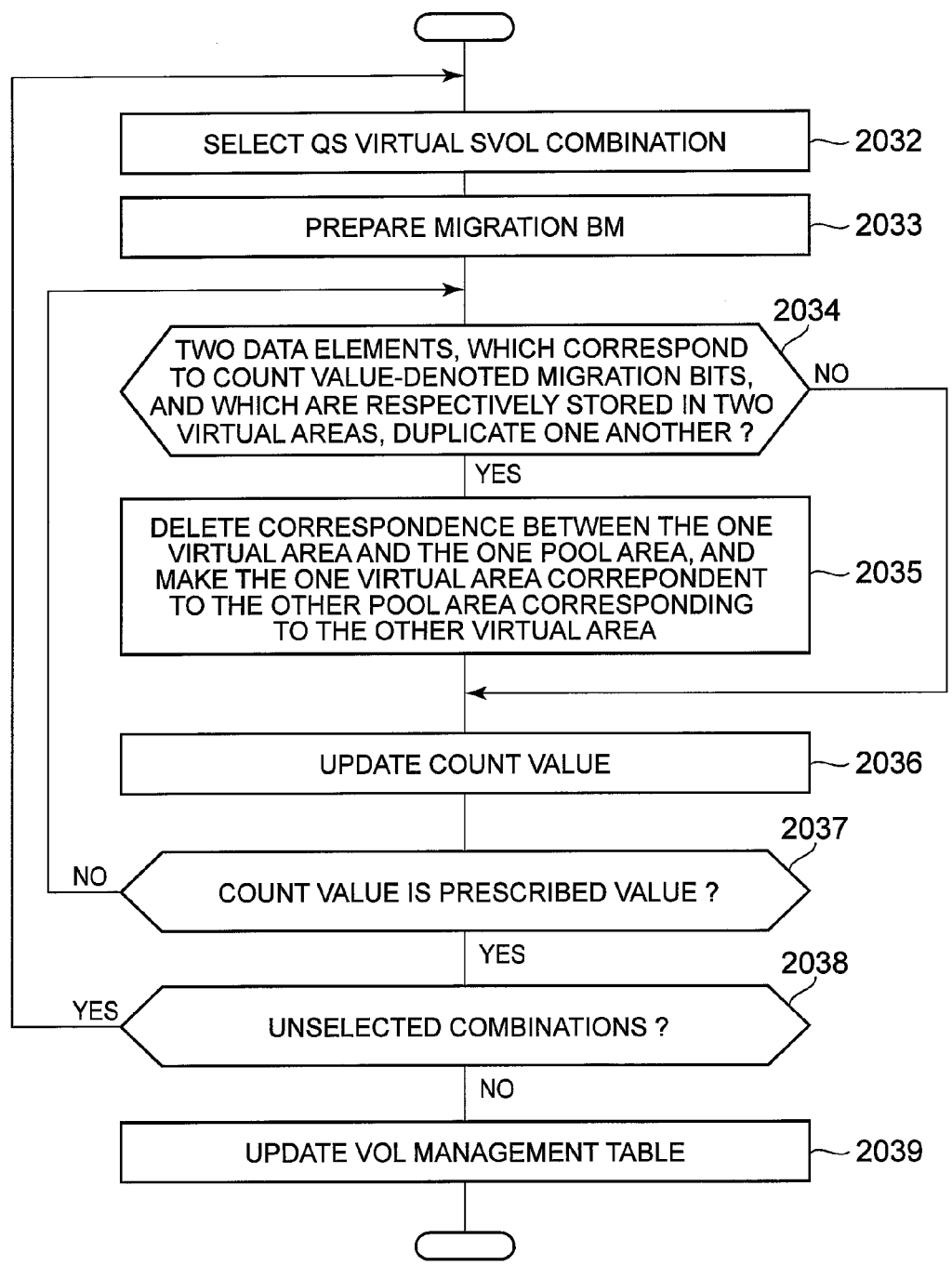
FIG. 6 shows an example of the flow of processing for switching from QS storage to COWS storage.

FIG. 6 shows an example of the flow of processing of a switch from QS storage to COWS storage. In the explanations of FIG. 6 and hereinafter-described FIG. 14, the virtual SVOL constituting a QS pair will be called the "QS virtual SVOL", and the virtual SVOL constituting a COWS pair will be called a "COWS virtual SVOL".

Switching from QS storage to COWS storage is carried out when there are a plurality of QS pairs that have the same VOL as the PVOL, in other words, when a plurality of QS virtual SVOLs exists for the same PVOL.

In Step 2032, the switch program 2203 selects one QS virtual SVOL combination from a plurality of QS virtual SVOLs.

In Step 2033, the switch program 2203 prepares a migration BM corresponding to the one QS virtual SVOL in the selected combination, and sets the number denoting the location of the leading migration bit in this migration BM as the count value.

In Step 2034, the switch program 2203 determines whether or not the two data elements stored in the two virtual areas corresponding to the migration bit denoted by the count value (the two virtual areas in the two QS virtual SVOL constituting the combination selected in Step 2032) duplicate one another. When the determination is that these two data elements are duplicates, Step 2035 is carried out, and when the determination is that these two data elements are not duplicates, Step 2036 is carried out.

In Step 2035, the switch program 2203 deletes the correspondence between the one virtual area and the one pool area, and makes this the one virtual area correspondent to the other pool area, which is correspondent to the other virtual area. More specifically, for example, the switch program 2203 makes the address 902, which corresponds to the address 901 of the one virtual area in the area mapping table 910 corresponding to the one QS virtual SVOL, the address of the other pool area. The one pool area, for which the correspondence was deleted, can be managed as an unallocated pool area. If two or more virtual areas are either directly or indirectly correspondent to the above-mentioned the other pool area, the one virtual area is made correspondent to this the other pool area. The number of virtual areas correspondent to a pool area, for example, is comprised in the pool area management information 912 recorded in the pool area management table 920 corresponding to this pool area.

In Step 2036, the switch program 2203 increments the count value denoting the location of the migration bit.

In Step 2037, the switch program 2203 determines whether or not the post-increment count value is a prescribed value (for example, the number of bits constituting the migration BM). If the count value is not the prescribed value, the switch program 2203 executes Step 2034, and if the count value is the prescribed value, the switch program 2203 executes Step 2038.

In Step 2038, the switch program 2203 determines if there is an unselected combination (QS virtual SVOL combination), and if there is, executes Step 2032, and if there is not, executes Step 2039.

In Step 2039, the switch program 2203 updates the data storage modes corresponding respectively to the above-mentioned same PVOL and plurality of QS virtual SVOLs in the VOL management table 22051 from "QS" to "COWS". Consequently, the respective QS virtual SVOLs become COWS virtual SVOLs in the storage system 20.

<<I/O Processing while Switching from QS Storage to COWS Storage>>

Figure 14:
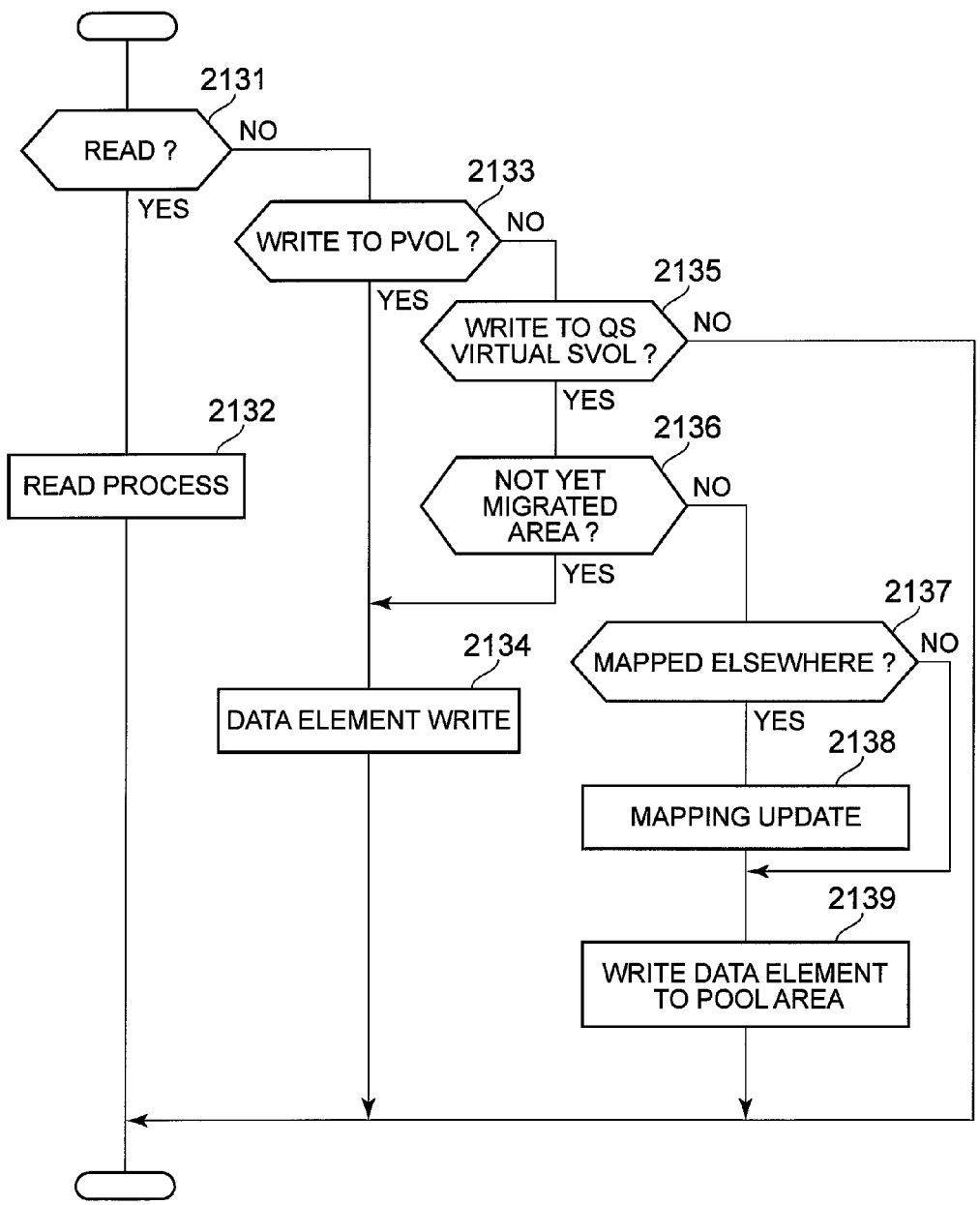
FIG. 14 shows the flow of processing executed when an I/O command is received from a host computer while switching from QS storage to COWS storage.

FIG. 14 shows the flow of processing executed when an I/O command is received from host computer 51A while switching from QS storage to COWS storage.

When the received I/O command is a read command (Step 2131: YES), the I/O program 2202 reads the data element from the storage area specified by this read command (the storage area of the PVOL constituting the QS pair, or the storage area of the QS virtual SVOL constituting the QS pair), and sends the read-out data element to the host computer 51A (Step 2132).

When the received I/O command is a write command specifying a PVOL storage area (Step 2131: NO, Step 2133: YES), the I/O program 2202 writes the data element to the storage area specified by this write command (Step 2134).

If the received I/O command is a write command specifying a storage area of the QS virtual SVOL (Step 2131: NO, Step 2133: NO, Step 2135: YES), and this write-destination virtual area is a virtual area for which migration is not finished (more specifically, if the migration bit corresponding to this write-destination virtual area has not been updated to the value denoting the end of migration) (Step 2136: YES), the I/O program 2202 writes the data element to this virtual area (Step 2134).

If this write-destination storage area is a migration-complete virtual area (Step 2136: NO), the I/O program 2202 determines whether or not this write-destination virtual area has been mapped to the other virtual area in the other QS virtual SVOL (For example, the I/O program 2202 determines if the address 902 of this write-destination virtual area has been made correspondent to the address 901 of the other virtual area of the other QS virtual SVOL in the area mapping table 910 corresponding to the other QS virtual SVOL.) (Step 2137).

If the determination result of Step 2137 is that mapping has been carried out (Step 2137: YES), the I/O program 2202 changes the mapping destination of the above-mentioned the other virtual area from the write-destination virtual area to the pool area corresponding to this write-destination virtual area, makes a separate pool area correspondent to the write-destination virtual area (Step 2138), and writes the data element conforming to the write command to this separate pool area (Step 2139). In this case, for example, data element A is stored in the pool area PL corresponding to the write-destination virtual area S1, and when the other virtual area S2 in the other QS virtual SVOL is mapped to the write-destination storage area S1, the mapping destination of the other virtual area S2 is changed from the write-destination virtual area S1 to the pool area PL, a separate pool area PL' is allocated to the write-destination virtual area S1, and a data element B conforming to the write command is written to the separate pool area PL'. That is, data element A, which is stored in the write-destination storage area S1 is left as-is without being overwritten.

Conversely, if the determination result of Step 2137 is that mapping has not been carried out (Step 2137: NO), the I/O program 2202 writes the data element conforming to the write command in the pool area, which has been made correspondent to the write-destination storage area (Step 2139). In this case, for example, when data element A is stored in the pool area PL corresponding to the write-destination virtual area S1, data element B, which conforms to the write command, is written to this pool area PL. That is, data element A, which is stored in the write-destination storage area S1, is updated to data element B.

<<Arrow 204 of FIG. 2: Switch from Replication Storage to COWS Storage>>

Figure 7:
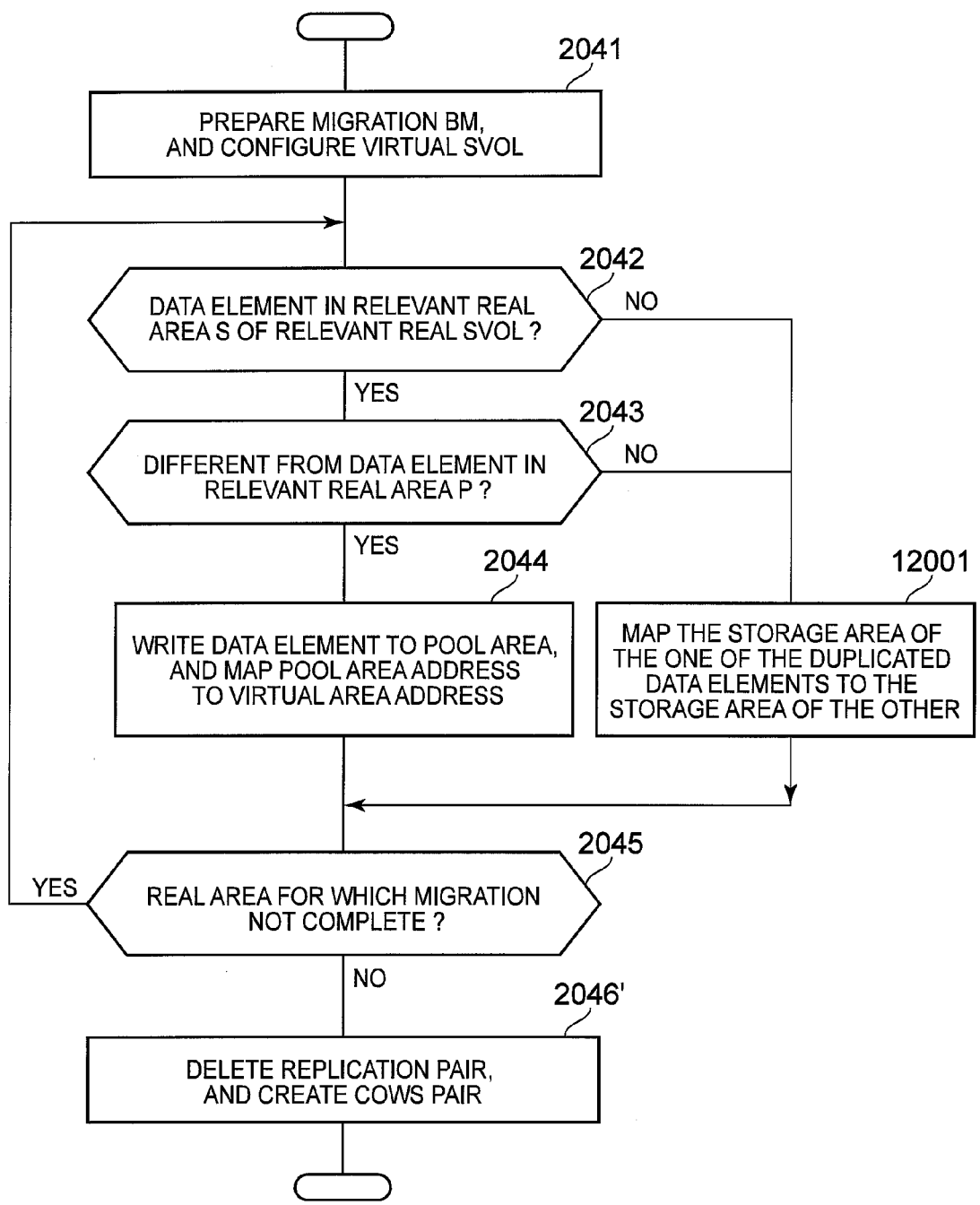
FIG. 7 shows an example of the flow of processing for switching from replication storage to COWS storage.

FIG. 7 shows an example of the flow of processing of a switch from replication storage to COWS storage.

Steps 2041 through 2046' respectively correspond to Steps 2011 through 2016 in FIG. 5. The process flow shown in FIG. 7 differs from the process flow shown in FIG. 5 in the following aspects, but the other aspects of these process flows are substantially the same.

When Steps 2042 and 2043 are NO, the data content of replication real SVOL is the same as that of the replication real PVOL. For this reason, the switch program 2203 updates the area mapping table 910 corresponding to the relevant virtual SVOL (the virtual SVOL, which is the switching destination this time) (Step 12001). More specifically, for example, the switch program 2203, in the area mapping table 910, writes either the address of the virtual area SV (virtual area of the existing COWS virtual SVOL) or the address of the pool area corresponding to the virtual area SV as the address 902, which corresponds to the virtual area SV' corresponding to the real area SR (the virtual area in the relevant virtual SVOL). In this case, Step 2044 is not carried out. Consequently, it is possible to prevent duplicate data elements from existing in the pool 2400. Since the data content of the replication real SVOL differs from that of the replication real PVOL when Step 2043 is YES, the switch program 2203 reserves an area in which to store data, and stores the data, the same as in the processing of Step 2014 (Step 2044).

In Step 2046', the switch program 2203 deletes the pair, which has the relevant replication real SVOL as a component, and creates a pair from the relevant real PVOL and relevant virtual SVOL as a pair for which COWS storage will be carried out.

<<I/O Processing while Switching from Replication Storage to COWS Storage>>

Figure 15:
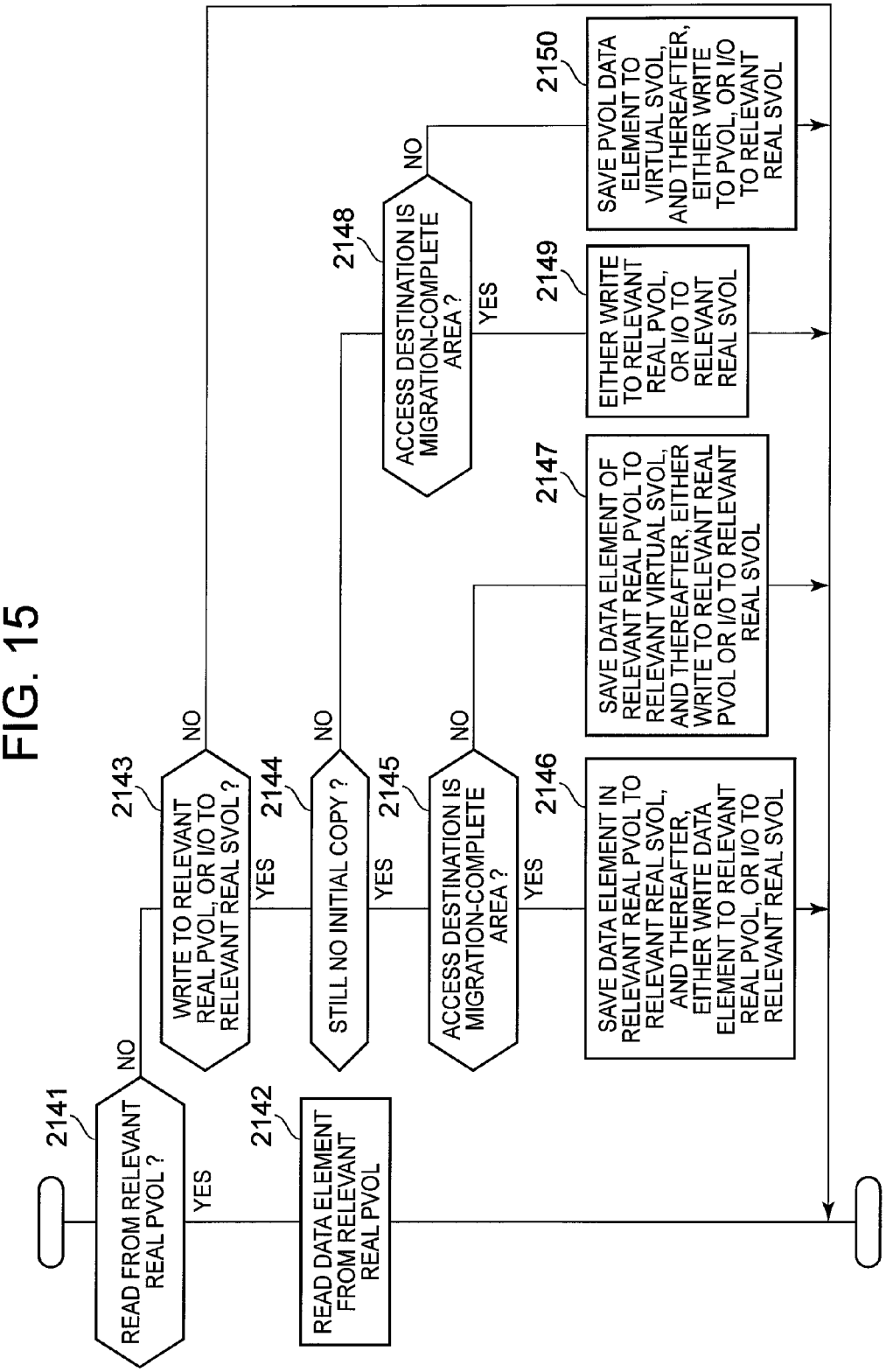
FIG. 15 shows the flow of processing executed when an I/O command is received from a host computer while switching from replication storage to COWS storage.

FIG. 15 shows the flow of processing executed when an I/O command is received from host computer 51A while switching from replication storage to COWS storage.

Steps 2141 through 2150' respectively correspond to Steps 2111 through 2120 in FIG. 13. The process flow shown in FIG. 15 differs from the process flow shown in FIG. 13 in the following aspect, but the other aspects of these process flows are substantially the same.

In Step 2150', the I/O program 2202 copies the data element, which is in the specified real area P or the corresponding real area P, to a virtual area in the relevant virtual SVOL (actually, to a pool area allocated to this virtual area), which corresponds to the corresponding real area S or the specified real area S, and thereafter, writes the write-targeted data element to either the specified real area P or the copy-destination virtual area.

<<Migration from Real PVOL to Expanded-Capacity VOL>>

Next, a migration process from the real PVOL to the expanded-capacity VOL (virtual volume in accordance with Thin Provisioning technology) will be explained by referring to FIG. 8.

When a write command specifying the real PVOL is received, the I/O program 2202 determines whether or not an old data element (a saved data element) is stored in the real area P specified by the write command (Step 2051). When an old data element is stored (Step 2051: YES), the I/O program 2202 searches to determines whether or not there is a virtual SVOL, which uses the old data element (for example, a virtual SVOL, which has a real PVOL as the PVOL) (Step 2052). If such a virtual SVOL exists (Step 2052: YES), the I/O program 2202 allocates a pool area to the virtual area SV of the virtual SVOL corresponding to the real area P in which the old data element is stored, either writes this old data element to this pool area, or, if the same data element is already stored in this virtual area SV, discards this old data element from the real area P (Step 2053). The I/O program 2202 allocates a pool area to the virtual area PV in the expanded-capacity VOL corresponding to the real area P specified by the write command, and writes the data element conforming to the write command to the pool area (Step 2054). At this time, the I/O program 2202 records the address 902 of the allocated pool area, and the address 901 of the allocation-destination virtual area PV of this pool area in the area mapping table 910 corresponding to the expanded-capacity VOL.

Figure 16:
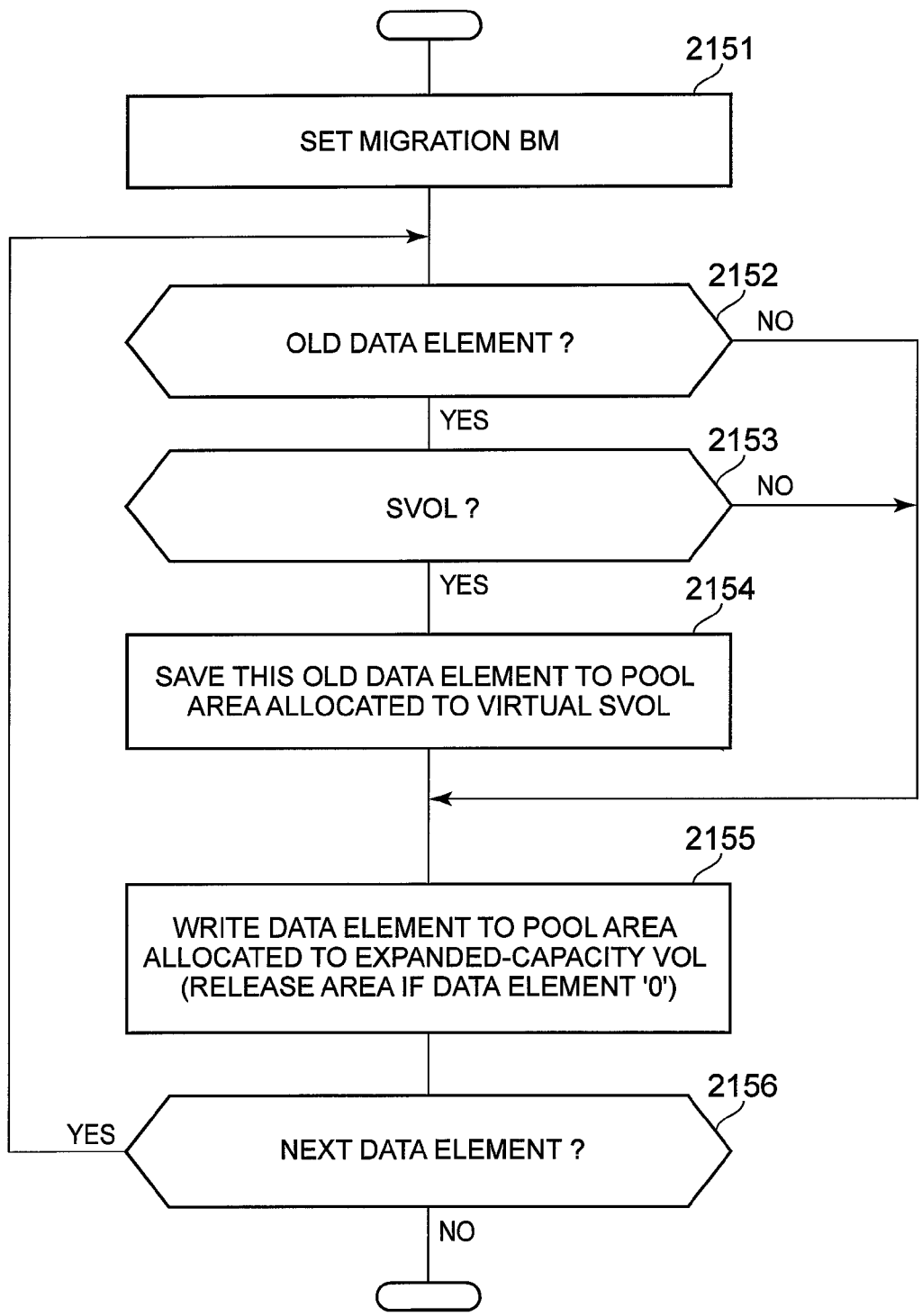
FIG. 16 shows another example of the flow of processing for switching from a real PVOL to an expanded-capacity VOL.

Another example of a migration from a real PVOL to an expanded-capacity VOL will be explained by referring to FIG. 16. In this example, a migration BM will be used. More specifically, first, the I/O program 2202 initializes a migration BM showing the real area of the real PVOL up to which the expanded-capacity VOL applies, and sets a count value in the value denoting the leading migration bit of the migration BM (Step 2151). The I/O program 2202 carries out processing in order from the real area corresponding to the migration bit denoted by the count value. The I/O program 2202 determines whether or not an old data element is stored in the real area P corresponding to the migration bit denoted by the count value (Step 2152), and if an old data element is being stored (Step 2152: YES), the I/O program 2202 carries out the same processing as in Steps 2052 and 2053 of FIG. 8 (Steps 2153 and 2154). Thereafter, the I/O program 2202 allocates a pool area to the virtual area PV corresponding to the real area P, and writes the old data element to the pool area (Step 2155). At this time, the I/O program 2202 records the address 902 of the allocated pool area and the address 901 of the allocation-destination virtual area PV of this pool area in the area mapping table 910 corresponding to the expanded-capacity VOL. Thereafter, the I/O program 2202 increments the count value, and if there is an unprocessed real area, carries out Step 2152.

A method for using the above-described initial BM and update BM will be explained by referring to FIG. 16 (and/or FIG. 8).

For example, when both the initial bit and update bit, which correspond to the real area P corresponding to the migration bit (or the real area P specified by a write command) are '0', since initial copying is finished, but updating has not been done for this real area P, the data element in this real area P, and the data element stored in the storage area S corresponding to this real area P (for example, the storage area in the replication real SVOL) are the same. Thus, the I/O program 2202 discards the data element in the storage area S, and releases the storage area S. Furthermore, the data element in the real area P is stored in the pool area allocated to the expanded-capacity VOL. The area mapping tables 910 corresponding to real PVOL and SVOL are both updated to show the pool area allocated to the expanded-capacity VOL in the real area P and storage area S.

Also, for example, when the initial bit, which corresponds to the real area P corresponding to the migration bit (or the real area P specified by the write command) is '0', and the update bit is '1', and the initial copy is finished and updating has been done for this real area P, the data element stored in the real area P and the data element stored in the storage area S are different. The data element in the storage area S is stored in the pool area allocated to the virtual area SV corresponding to this storage area S.

Further, for example, when the initial bit, which corresponds to the real area P corresponding to the migration bit (or, the real area P specified by a write command), is '1', the initial copy has not been implemented, and therefore, if the data element in this real area P is not a prescribed data pattern (for example, if the data element denotes '1' instead of '0'), a pool area is allocated to the virtual area PV corresponding to this real area P, this data element is stored in this pool area, and the this real area P is released. If there is no data in this real area P, or if the data element is the prescribed data pattern, the real area P is released without allocating a pool area.

Figure 8:
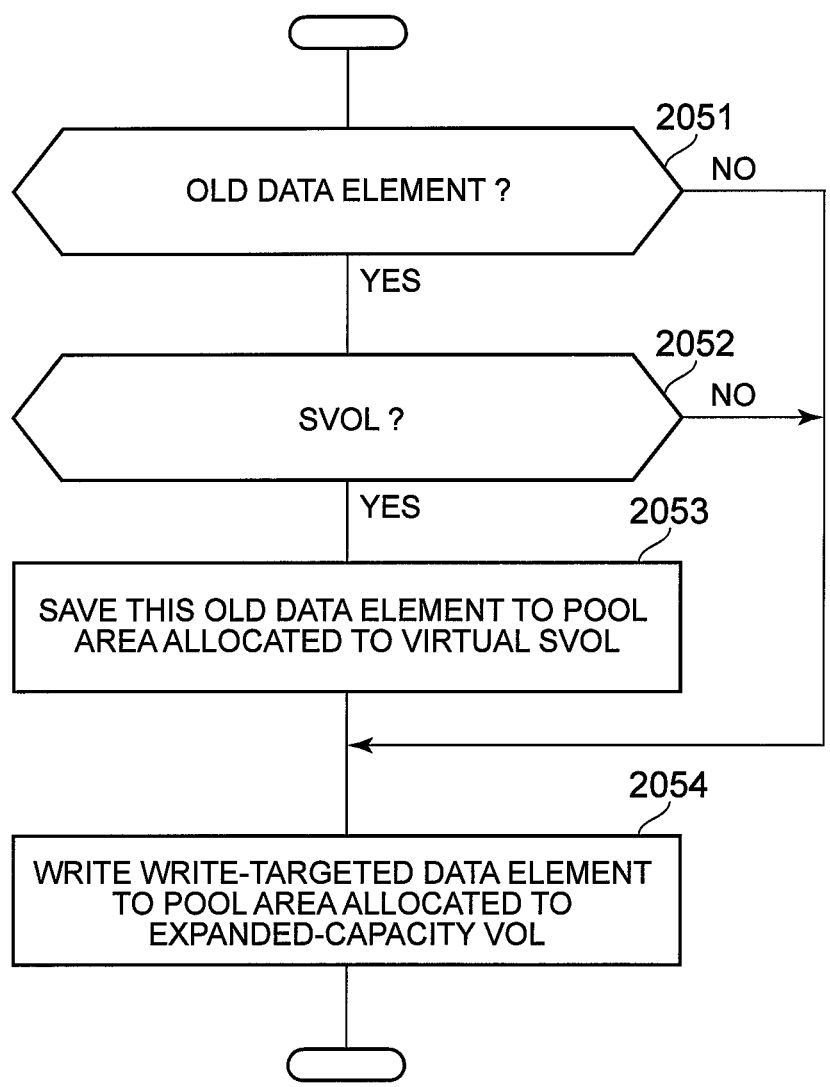
FIG. 8 shows an example of the flow of processing for switching from a real PVOL to an expanded-capacity VOL.

In FIG. 8, when pool areas are allocated to all of the one or more virtual areas (virtual areas in the expanded-capacity VOL) corresponding to one or more real areas in which data elements, which are not prescribed data patterns, are stored, the migration from the real PVOL to the expanded-capacity VOL is complete. In FIG. 16, the migration from the real PVOL to the expanded-capacity VOL is complete when Steps 2152 through 2155 for the count value denoting a prescribed value (the value denoting the final migration bit) have ended. The I/O program 2202, upon receiving from host computer 51A a read command specifying a virtual area to which a pool area has not been allocated (an expanded-capacity VOL), returns a prescribed data pattern data element (for example, a data element denoting '0') to the host computer 51A. This, for example, can also be applied to a virtual SVOL. That is, when a read command specifying a virtual area to which a pool area has not been allocated is received from host computer 51A for a virtual SVOL, the I/O program 2202 (or the switch program 2203) returns a prescribed data pattern data element (for example, a data element denoting '0') to the host computer 51A.

<<Read/Write Processing for Real PVOL while Switching Data Storage Modes>>

For example, when a write command specifying a real area P is received during the switching of data storage modes, if it is the first write to this real area P subsequent to commencing a migration from a real PVOL to an expanded-capacity VOL, the I/O program 2202 reserves a pool area corresponding to the real area P, and stores a data element conforming to the write command in this pool area. When an old data element is already in the real area P, the I/O program 2202 carries out a search to determines whether or not there is an SVOL, which is storing this data element (for example, a replication real SVOL in replication storage). If such an SVOL exists, the I/O program 2202 writes this old data element to the pool area allocated to the virtual SVOL. Or, if the same old data element is already stored in the virtual SVOL, the I/O program 2202 overwrites the old data element in the real area P with the data element conforming to the write command without writing the old data element to this virtual SVOL (or, discards the real area P, allocates a pool area to the virtual area PV corresponding to this real area P (a virtual area in the expanded-capacity VOL), and writes the data element conforming to the write command to this pool area). In the case of a write to a virtual area in a COWS virtual SVOL, if this virtual area shares a data element stored in a real PVOL in replication storage, the I/O program 2202 saves this shared data element to the COWS virtual SVOL, after which it overwrites the old data element in the real area P with the data element conforming to the write command (or, discards the real area P, allocates a pool area to the virtual area PV corresponding to the real area P (a virtual area in the expanded-capacity VOL), and writes the data element conforming to the write command to this pool area). Thereafter, the I/O program 2202 updates the initial bit corresponding to the virtual area in the COWS virtual SVOL to '0', and updates the difference bit to '1'.

<<Area Release>>

The release of the one storage area in which a duplicated data element is stored, and/or of a storage area in which a prescribed data pattern data element is stored is carried out in a data storage mode migration process, and/or a migration process from a real PVOL to an expanded-capacity VOL. If this storage area is a virtual area, the allocation of a pool area, which has been allocated to the virtual area, can be deleted, and this pool area can be allocated to another virtual area.

More specifically, for example, in a migration from replication storage to snapshot storage (either QS storage or COWS storage), when the data element is not stored in a replication real SVOL, when the data element has not been copied from a real PVOL, or when the data element is not stored in the real PVOL, the virtual area in the virtual SVOL corresponding to this data element is released. When the expanded-capacity VOL constitutes the PVOL in replication storage instead of a real PVOL, the virtual area in the expanded-capacity VOL, in which this data element is stored, is also released. Even when copying from a PVOL is finished, if the data element is not in the replication real SVOL, the virtual area in the virtual SVOL, which corresponds to this data element, is released. Furthermore, the fact that the data element is not stored denotes a situation in which '0' is entered as the data element by virtue of the logical volume format. The storage system 20 can determine if a '0' data element is being stored in accordance with the format, or if a '0' data element is being stored as a write-targeted data element. Furthermore, for example, when migrating from a real PVOL to an expanded-capacity VOL, the I/O program 2202 can release the virtual area in which data element '0' is stored regardless of whether data element '0' conforms with the format or a write command. In this case, the I/O program 2202, upon receiving from host computer 51A a read command, which specifies a virtual area to which a pool area has not been allocated, returns data element '0' to host computer 51A.

The preceding is an explanation of the first embodiment. Furthermore, in the above-described embodiment, for example, when the PVOL and replication real SVOL of a replication pair have exactly the same contents, this PVOL can only be the PVOL of the QS virtual SVOL, and the switch from replication storage to QS storage ends. In this case, all the storage areas of the replication real SVOL can be released.

Second Embodiment

A second embodiment of the present invention will be explained hereinbelow. In so doing, the explanation will focus on the points of difference with the first embodiment, and explanations of the points in common with the first embodiment will be simplified or omitted.

In this embodiment, when a data element stored in an SVOL in a pre-switch data storage mode is encrypted, the data element stored in the SVOL in the post-switch data storage mode is also encrypted. That is, the assurance of security does not change. Any unit can be used to carry out encryption. For example, encryption can be carried out in the storage area units, which make up a logical volume, in a prescribed number of storage area units, or in pool units.

A number of specific examples will be explained below.

Figure 19A:
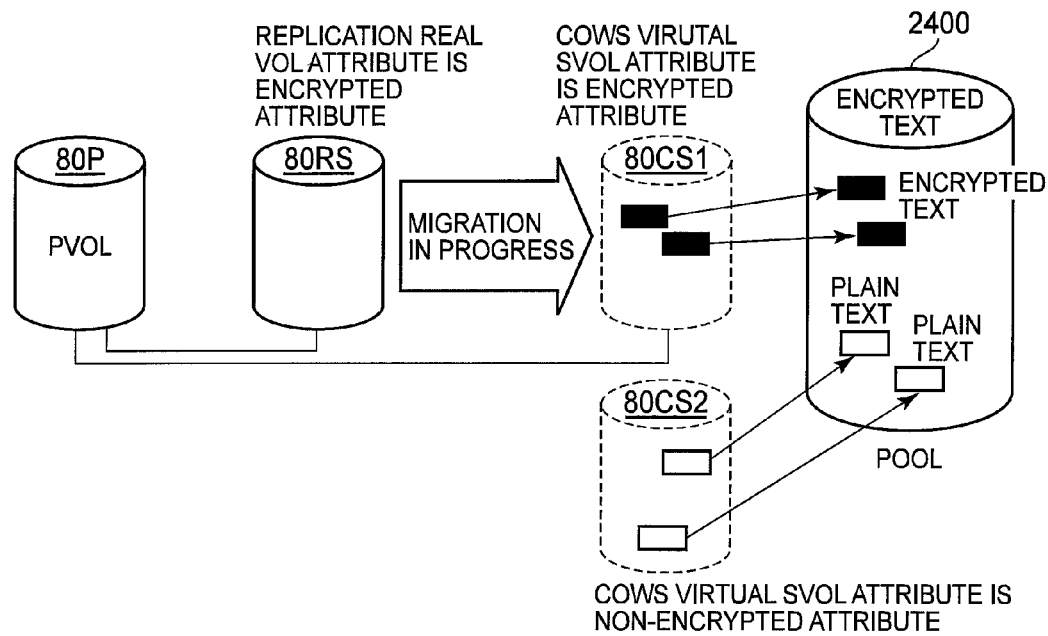
FIG. 19A shows a first example of encryption in a second embodiment of the present invention.

According to the specific example shown in FIG. 19A, the attribute of the replication real SVOL is an encrypted attribute. In this case, for example, when the I/O program 2202 writes a data element to the replication real SVOL, the I/O program 2202 writes this data element to this replication real SVOL after encrypting the data element. In this state, when switching from replication storage to COWS storage, in other words, when the SVOL corresponding to PVOL 80P is switched from replication real SVOL 80RS to COWS virtual SVOL 80CS1, since replication real SVOL 80RS, which is the switch source, constitutes an encrypted attribute, switch-destination COWS virtual SVOL 80CS1 is also made an encrypted attribute. More specifically, for example, the switch program 2203 either writes the encrypted data element, which is stored in replication real SVOL 80RS, as-is to the pool area allocated to the virtual area of the COWS virtual SVOL 80CS1, or uses a first encryption/decryption method and/or a first encryption key (for example, an encryption/decryption method and/or an encryption key corresponding to the replication real SVOL 80RS) to decrypt the encrypted data element one time, then uses a second encryption/decryption method and/or a second encryption key (for example, an encryption/decryption method and/or an encryption key corresponding to the COWS virtual SVOL 80CS1) to encrypt the decrypted data element, and writes the encrypted data element to the pool area allocated to a virtual area of the COWS virtual SVOL 80CS1.

In the case of COWS storage, the pool 2400 may be shared by another COWS virtual SVOL 80CS2, which does not constitute an encrypted attribute. Thus, an encrypted data element (encrypted text) may be mixed in with an unencrypted data element (plain text) in the pool 2400.

Figure 19B:
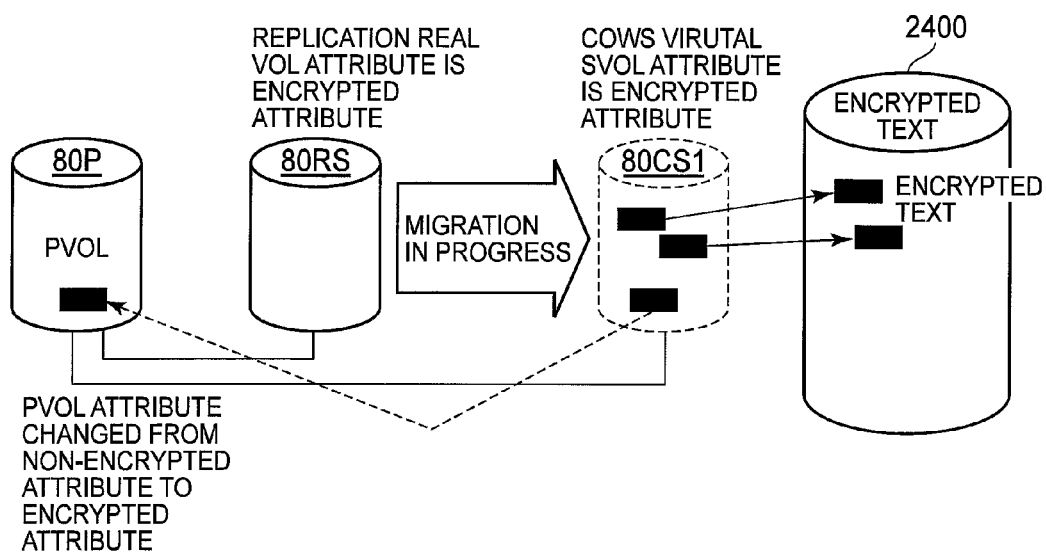
FIG. 19B shows a second example of encryption in the second embodiment.

Further, since a virtual area in the COWS virtual SVOL 80CS1 can be mapped to a storage area in the PVOL 80P (in other words, since a data element stored in the PVOL 80P can be shared with the COWS virtual SVOL 80CS1), when the PVOL 80P of the COWS virtual SVOL 80CS1 is also not encrypted, security cannot be assured. Accordingly, in this embodiment, when switching is carried out from this replication real SVOL 80RS to the COWS virtual SVOL in a state in which the PVOL in the replication pair does not constitute an encrypted attribute, but the replication real SVOL 80RS does constitute an encrypted attribute as shown in FIG. 19B, both the COWS virtual SVOL 80CS1 and the PVOL 80P are made encrypted attributes (For example, a stored data element in the PVOL 80P is encrypted by the I/O program 2202.).

Figure 20A:
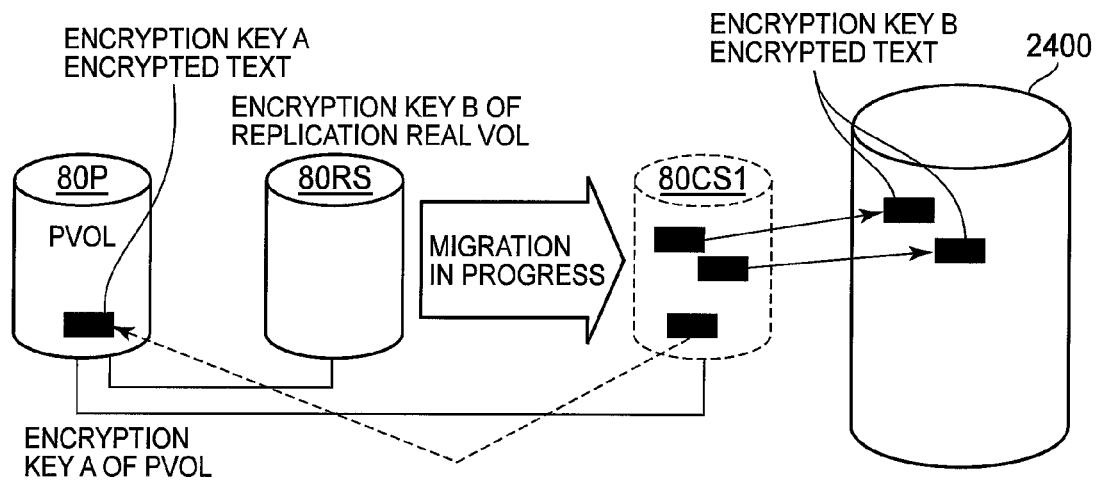
FIG. 20A shows a third example of encryption in the second embodiment.

Further, as shown in FIG. 20, encryption keys that differ for each logical volume can be prepared. For example, a different encryption key is stored for PVOL 80P and replication real SVOL 80RS in, for example, the memory 22 (for example, information denoting which encryption key corresponds to which logical volume is stored in the memory 22). Hereinafter, the encryption key corresponding to PVOL 80P will be "encryption key A" and the encryption key corresponding to replication real SVOL 80RS will be "encryption key B". In a switch from replication storage to COWS storage, encryption can be carried out using encryption key A for a data element shared with PVOL 80P of the data elements stored in the COWS virtual SVOL 80CS1, and encryption can be carried out using encryption key B for a data element, which is not shared with PVOL 80P. Or, if encryption key C corresponding to COWS virtual SVOL 80CS1 is prepared, encryption can be carried out using encryption key C instead of encryption key B. That is, since the PVOL and SVOL encryption keys differ prior to a switch, the PVOL and SVOL encryption keys will also differ subsequent to a switch (even if encryption key B is the only alternative, a data element in a post-switch SVOL is encrypted by an encryption key that differs from encryption key A of the PVOL.).

A number of specific examples of switching from replication storage to COWS storage have been explained above, but the process described hereinabove can also be applied to the switching of other data storage modes. For example, the above processing can be applied to a switch from replication storage to QS storage. In this case, the switch will differ from the switch from replication storage to COWS storage in that the sharing of data elements in the pool 2400 does not occur. Further, for example, an aspect in which encryption is not carried out in the switch-destination SVOL even though encryption has been carried out in the switch-source SVOL can also be employed, but in this case, the CPU 21 can issue a warning to the user (to a prescribed computer, such as either a host computer or the management computer).

Third Embodiment

In a third embodiment, a value, which is obtained based on a data element, and which is smaller in size than the size of the data element, is used in determining whether or not data elements read out from a plurality of logical volumes duplicate one another. As this value, for example, a data element hash value, or the redundancy code of this data element (for example, CRC (Cyclic Redundancy Check) or LRC (Longitudinal Redundancy Check)) can be used.

A number of specific examples will be explained below.

<<Hash Value Method>>

Figure 20B:
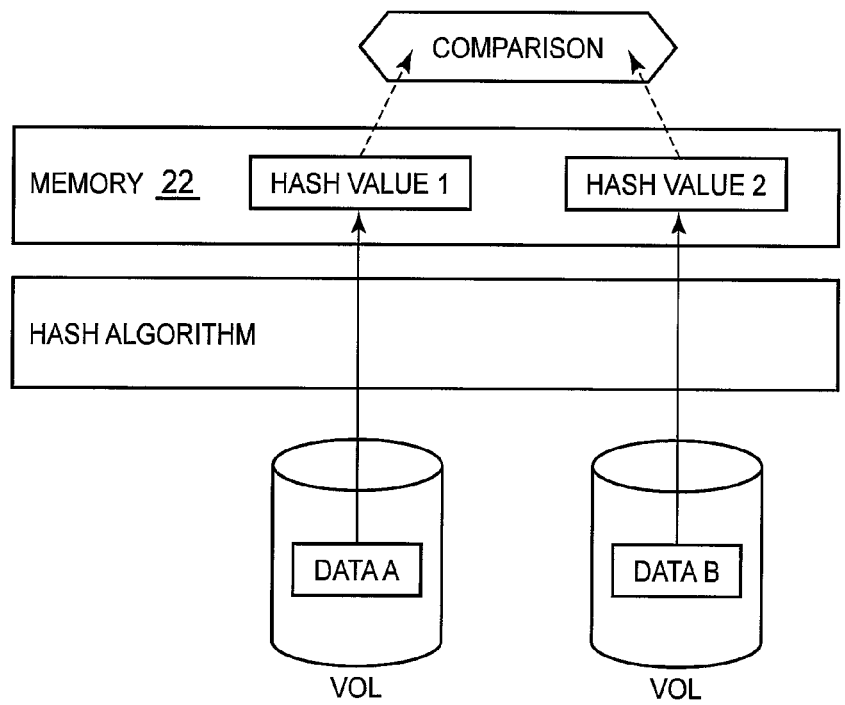
FIG. 20B shows a concept for a hash value method in a third embodiment of the present invention.

FIG. 20B shows the concept of a hash value method. The flow of processing in a hash value method will be explained hereinbelow by referring to this figure.

(Step 1) For example, the CPU 21 manages one or more storage areas as a segment for each logical volume. To make the explanation easier to understand, one storage area is one segment here.

(Step 2) Hash values of data elements stored in segments of the respective logical volumes are calculated at an arbitrary time (for example, when determining whether or not data elements are duplicated, or at a stage prior thereto). The hash value calculation can be carried out by the CPU 21 executing a computer program for calculating the hash value of a data element using a prescribed hash algorithm, or a data element can be inputted into a hardware circuit for executing a prescribed hash algorithm, and the hash value calculation can be carried out by this hardware circuit. Hereinbelow, it is supposed that this hash value calculation is executed by the CPU 21. The calculated plurality of hash values corresponding to the respective plurality of data elements is stored in the memory 22.

(Step 3) The CPU 21 searches among the plurality of hash values to determine whether or not there is a hash value with the same value as a certain hash value stored in the memory 22, thereby searching for a segment in which the same data element as the segment corresponding to this certain hash value is stored. If a hash value of the same value as the certain hash value is found, the CPU 21 executes (Step 4), and if the same value hash value is not found, the CPU 21 determines that duplicate data elements do not exist.

(Step 4) The CPU 21 compares data elements corresponding to the hash values that have the same value. When a match is obtained as a result of this, the CPU 21 determines that these data elements duplicate one another, and when there is no match, the CPU 21 determines that these data elements do not duplicate one another.

The preceding is an explanation of the hash value method.

When hash values differ from one another, the data elements corresponding thereto will invariably also differ from one another. Thus, according to this method, if the hash values differ from one another, there is no need to compare the data elements.

Further, the data size of a hash value is smaller than that of a data element. Therefore, data element duplication can be determined by comparing hash values having small data sizes. Further, for example, by storing all the calculated hash values in the memory 22 at once, and using the hash values stored in the memory 22 as needed as described hereinabove, the burden of reading out a data element from a disk drive at every data element determination can be eliminated.

Furthermore, in this method, for example, when a new data element is written to a logical volume, one or more data element hash values comprising this data element can be calculated either synchronously or asynchronously with this write (in other words, at an arbitrary time), and stored in the memory 22.

<<Redundancy Code Method>>

Figure 21A:
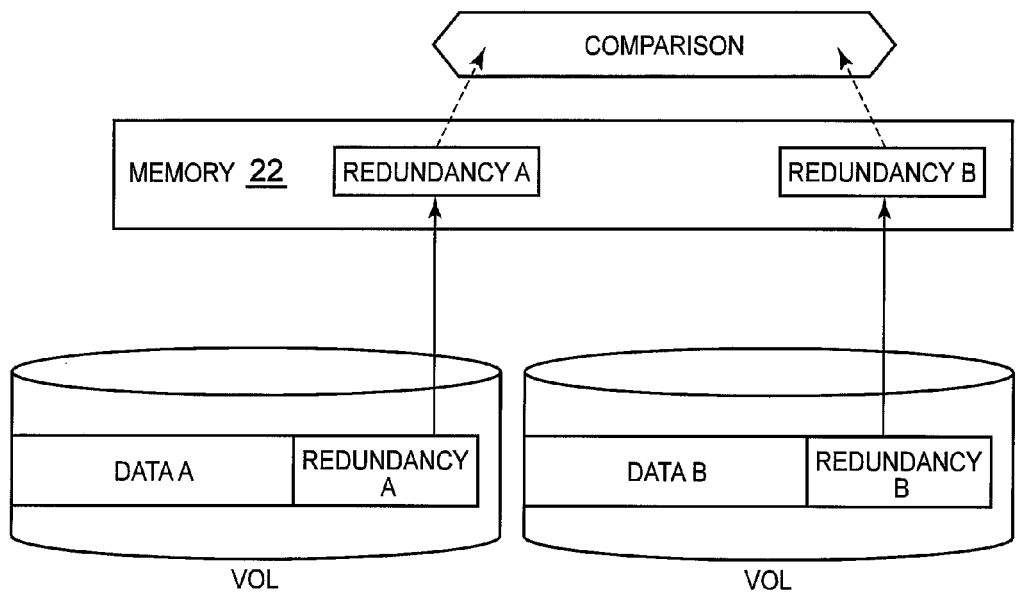
FIG. 21A shows a concept for a redundancy code method in the third embodiment.

FIG. 21A shows the concept of a redundancy code method.

In this method, instead of a hash value, a redundancy code (for example, a code that is generated and allocated for detecting garbled data on a media drive), which corresponds to one (or two or more) data elements, is used. More specifically, for example, in the above-described (Step 3), redundancy codes are compared. If the redundancy codes do not duplicate one another, it is determined that the data elements do not duplicate one another, and if the redundancy codes do duplicate one another, the data elements are compared in (Step 4).

In the hash value method described above, the data element itself is read out from the media drive (for example, a storage device such as an HDD or flash memory drive), but in this method, the redundancy code can be read out without having to read out the data element itself. Further, in this method, since the read-out redundancy codes are compared in place of the above-described hash values, there is no need to calculate hash values.

Furthermore, a redundancy code hash value can be calculated, and hash values can be compared. That is, a method that combines the hash value method and the redundancy code method can be used. In this case, a hash value can be calculated using a redundancy code the data size of which is smaller than that of the data element. Further, the data element need not be read out from the media drive for hash value calculation in this case, either.

<<Method Using Media Drive-Generated Redundancy Code>>

Figure 21B:
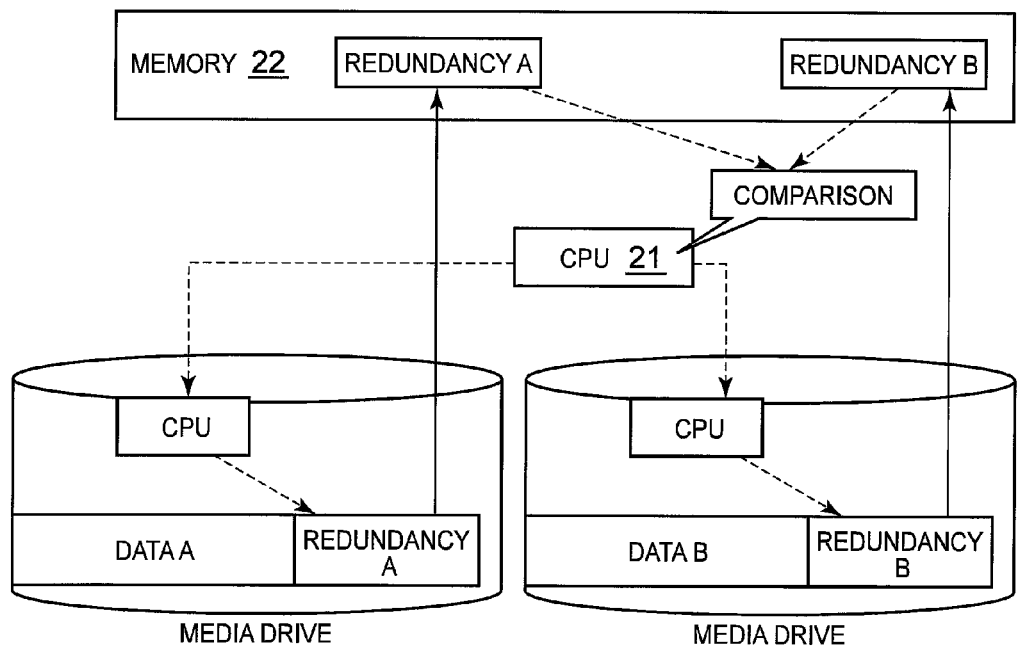
FIG. 21B shows an overview of a method for using a media drive-generated redundancy code.

FIG. 21B shows the concept of a method, which uses a media-drive-generated redundancy code.

This method is one that uses a redundancy code, which is calculated and stored inside the media drive, instead of the redundancy code in the above-described redundancy code method (that is, a redundancy code calculated by the CPU 21 in the storage system 20).

Furthermore, in this method, for example, the CPU 21 must have a function for sending a command (hereinafter, the redundancy code command) for acquiring a media drive-generated redundancy code. Then, the media drive must be equipped with a function (for example, an interface), which, upon receiving the redundancy code command from the CPU 21, analyzes this redundancy code command, and in response to this redundancy code command, sends to the CPU 21 a redundancy code created inside the media drive (for example, a redundancy code created by a CPU inside the media drive).

According to this method, the CPU 21 can get by without creating a redundancy code for each of one or more data elements.

Incidentally, in this method, the calculation method for creating a redundancy code is likely to differ in accordance with the media drive (more specifically, for example, the media drive type, vendor, interface, and so forth). Then, there is the likelihood that a plurality of media drives with different redundancy code calculation methods coexist in the storage system. In this case, for example, information denoting which calculation method is executed by which media drive, and information denoting a combination of media drives compatible with the calculated redundancy codes are stored in the memory 22. If the redundancy codes are comparable even though the redundancy code calculation methods differ, the CPU 21 carries out a duplication determination (a determination as to whether or not the data elements duplicate one another) using this method based on this information, and if the redundancy codes are not capable of being compared, the CPU 21 carries out a duplication determination using the above-described hash value method, redundancy code method, or a combination thereof.

Fourth Embodiment

Replication storage, QS storage and COWS storage is carried out between the storage systems 20A, 20B.

There is a pool 2400 in each storage system 20. For example, when replication storage is being carried out between the storage systems 20A, 20B, and a switch is to be made from replication storage to COWS storage, the storage system 20A having the PVOL has an initial BM, and an update BM corresponding to the PVOL (hereinafter, PVOL update BM), and the storage system 20B having the SVOL provides an update BM corresponding to the SVOL (hereinafter, SVOL update BM). The method for utilizing these bit maps, for example, is as follows. Furthermore, in the following explanation, a bit in the PVOL update BM will be referred to as the "PVOL update bit", and a bit in the SVOL update BM will be referred to as the "SVOL update bit".

That is, for example, when the initial bit, PVOL update bit, and SVOL update bit are '0', initial copying is complete, but updating has not been carried out, so that the data element in the storage area P in the PVOL is the same as the data element in the real area RS in the replication real SVOL. Thus, the data element in the real area RS is discarded, and this real area RS is released. Then, the virtual area VS in the COWS virtual SVOL is mapped to the real area P.

Further, for example, when the initial bit is '0', and either the PVOL update bit or the SVOL update bit is '1', initial copying is complete, and updating has been carried out, so that the data elements in the storage area P and the real area RS differ from one another. The data element in the real area RS is written to the pool area allocated to the corresponding virtual area VS.

Further, for example, when the initial bit is '1', initial copying has not been implemented, and the data elements are left as-is.

Fifth Embodiment

A linked VOL, which is defined by linking no less than two logical volumes (VOL) together as a single VOL, is made. Consequently, even if a VOL size upper limit has been preset inside the storage systems 20, a VOL of a size that exceeds this upper limit can be provided to a host computer.

In this embodiment, a linked PVOL is made using a real PVOL and a virtual PVOL (for example, an expanded-capacity VOL) (the respective number of real PVOL and virtual PVOL is one or more). Data (for example, operating system (OS) and other such data) shared among a plurality of users (a plurality of host computers) in a test environment or a parallel processing system is stored in the real PVOL, and data, which each user can write separately, is stored in the virtual PVOL.

Figure 11A:
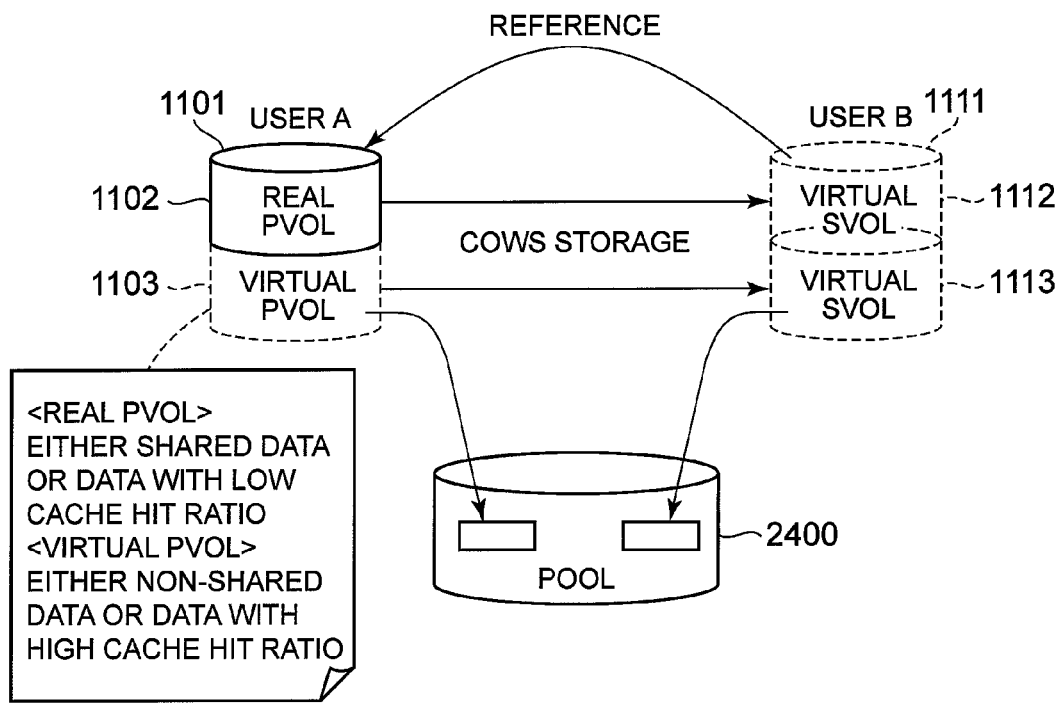
FIG. 11A shows an example of a linked VOL configuration and COWS storage in a fifth embodiment of the present invention.

The process for carrying out COWS storage in this linked VOL will be explained hereinbelow by referring to FIG. 11A.

A snapshot of linked VOL 1101 (linked VOL 1111 for COWS storage) is acquired. The COWS virtual SVOL, which constitutes a pair with the real PVOL 1102 of the linked VOL 1101, is virtual SVOL 1112, and the COWS virtual SVOL, which constitutes a pair with the virtual PVOL 1103 of the linked VOL 1101, is virtual SVOL 1113. Virtual SVOLs 1112 and 1113 make up linked VOL 1111.

As an example, user A (host computer A) uses copy-source linked VOL 1101, and user B (host computer B) uses copy-destination linked VOL 1111. Shared data (for example, OS) utilized by users A, B is stored in the real PVOL 1102 of the linked VOL 1101 utilized by user A. The respective virtual areas of the virtual SVOL 1112 are mapped to the respective real areas of real PVOL 1102. Thus, when user B loads OS and other such shared data, the shared data is read out from the real area of real PVOL 1102, to which the respective virtual areas of the virtual SVOL 1112 are mapped, by sending an I/O command, which specifies this virtual SVOL 1112.

In a no-rewrite-aspect of the real PVOL 1102 (hereinafter, pattern 1), for example, users A and B respectively write data elements to virtual PVOL 1103 and virtual SVOL 1113.

In a rewrite-aspect of the real PVOL 1102 (hereinafter, pattern 2), for example, since there is the likelihood that user B will utilize an old data element (a stored data element) in the real PVOL 1102 upon receiving a write command specifying the real PVOL 1102, the CPU 21 saves this old data element to a pool area in the pool 2400. At this time, the CPU 21 maps this pool area to a virtual area in the virtual SVOL 1112 corresponding to the save-source real area of this pool area.

Figure 11B:
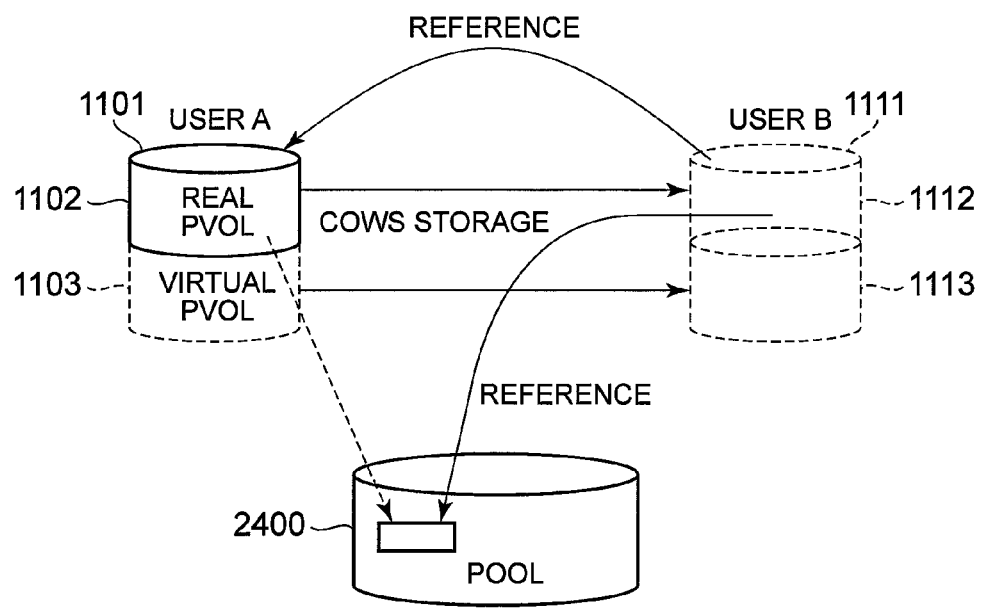
FIG. 11B shows an overview of the pattern by which a real PVOL rewrite occurs in the fifth embodiment.

Further, in another example, as shown in FIG. 11B, when the shared portions of users A and B are rewritten in accordance with upgrading the OS version from the system administrator (Root) (hereinafter, pattern 3), users A and B both carry out the OS version upgrades by combining pattern 3 with pattern 1. Or, it is also possible for only user A to upgrade the OS version by combining pattern 3 with pattern 2, and for user B to use the old version as-is. In pattern 2 and pattern 3, it is also possible to acquire a snapshot of the user B shared portion so as to be able to restore the shared portion (OS and so forth) status up to a certain point in time.

There is data, which is shared by a plurality of users, and concentrating this data in a real PVOL makes it possible to enhance capacity efficiency. Also, the fact that the data is shared increases the likelihood of this data residing in cache memory, thereby promising an enhanced cache hit ratio as well. Furthermore, a cache hit, for example, refers to when a read command is received, and the data element targeted by this read command is found in cache memory (comprising the memory 22). If the data element is found by a cache hit, the CPU 21 sends the data element in this cache memory to the host computer. If there is no cache hit (when this data element is not found in the cache memory), the CPU 21 reads out the data element from the media drive, temporarily stores the read-out data element in the cache memory, and sends this cache memory data element to the host computer.

In the linked VOL 1101 described above, the CPU 21 can store a data element with a low cache hit ratio (for example, a data element with a cache hit ratio of less than a certain threshold) in the real PVOL 1102, and can store a data element with a high cache hit ratio (for example, a data element with a cache hit ratio of greater than a certain threshold) in the virtual PVOL 1103. The real PVOL 1102 is considered to have higher read performance than the virtual PVOL 1103 due to the fact that searching to determine which pool area has been allocated to which virtual area is not necessary. Thus, by storing a data element, which has a high likelihood of a read being generated because of its low cache hit ratio, in the real PVOL 1102 makes it possible to enhance read performance.

Sixth Embodiment

Figure 12:
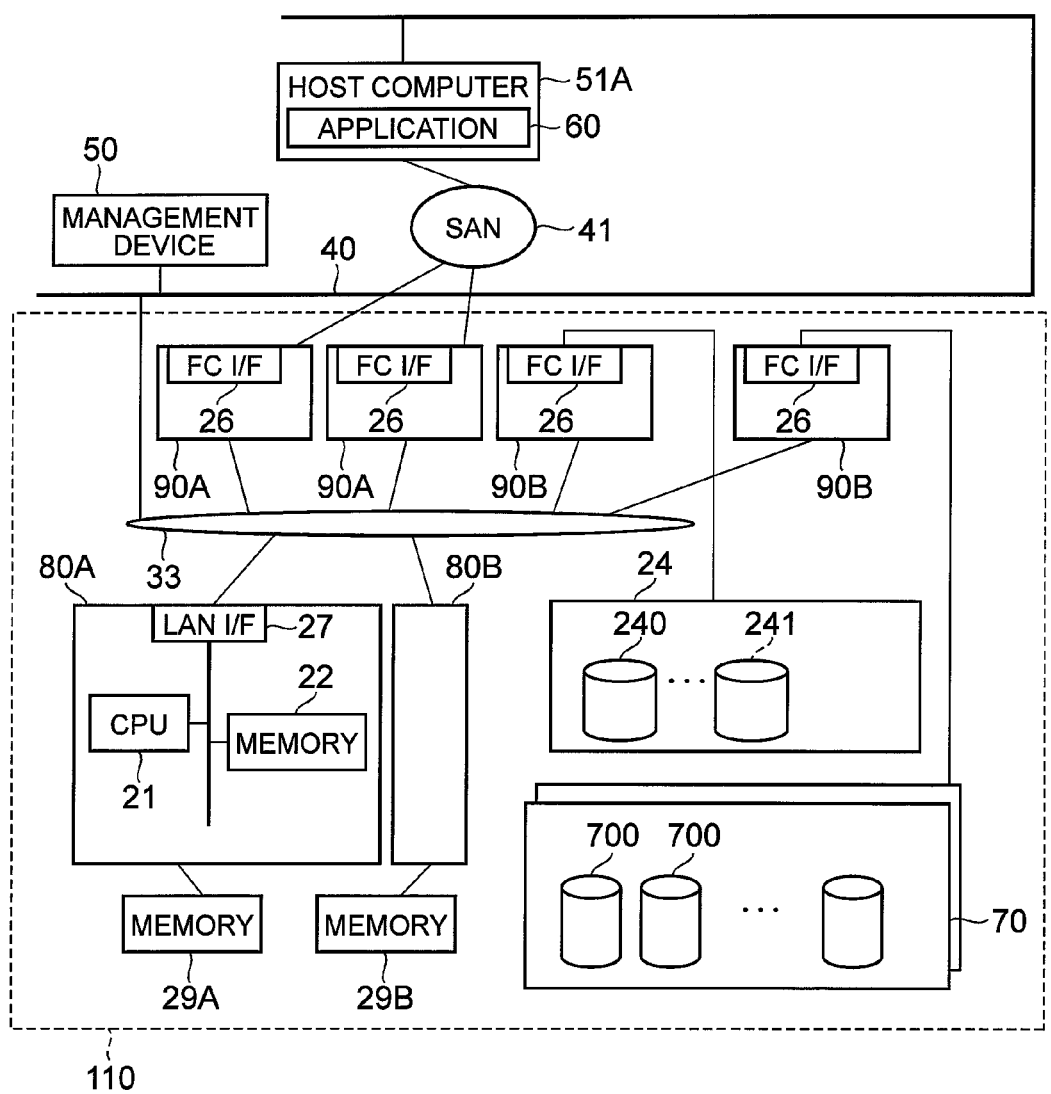
FIG. 12 shows an example of the configuration of a storage system related to a sixth embodiment of the present invention.

In a sixth embodiment, the configuration of the storage system differs. An example of this will be explained below by referring to FIG. 12.

The storage system 110 comprises an I/F package 90 (90A, 90B), a controller 80 (80A, 80B), nonvolatile memory 29 (29A, 29B), a network 33, which connects the I/F package 90 and the controller 80, and storage units 24 and 70. The respective elements comprise at least one element.

The storage system 110 is connected to a host computer 51 via a SAN 41. Configuration information for identifying which VOLs are stored in which controllers 80 is stored in the storage resource (not shown in the figure) of I/F package unit 90A. The configuration information is also stored in local memory 22 inside a controller 80, and in nonvolatile memory 29.

The I/F package unit 90A, upon receiving an I/O command from the host computer 51A, analyzes the I/O command, determines the controller 80 under which the VOL storing the data being requested by this I/O command is managed, and carries out a process for distributing the I/O command to this controller 80. Further, data is also transferred to the other I/F package unit 90B, and to the storage units 24 and 70. The controller 80 transfers the data element to the nonvolatile memory 29.

Seventh Embodiment

Figure 22A:
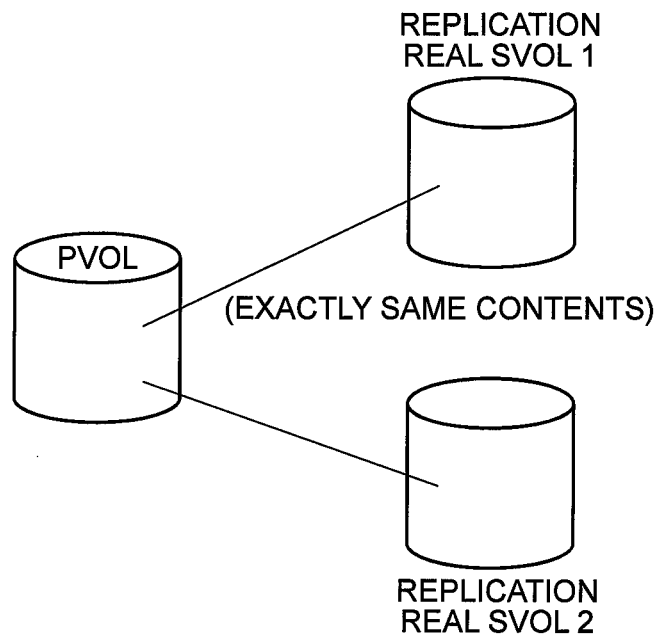
FIG. 22A shows respective logical volumes prior to switching the data storage mode in a seventh embodiment of the present invention.
Figure 22B:
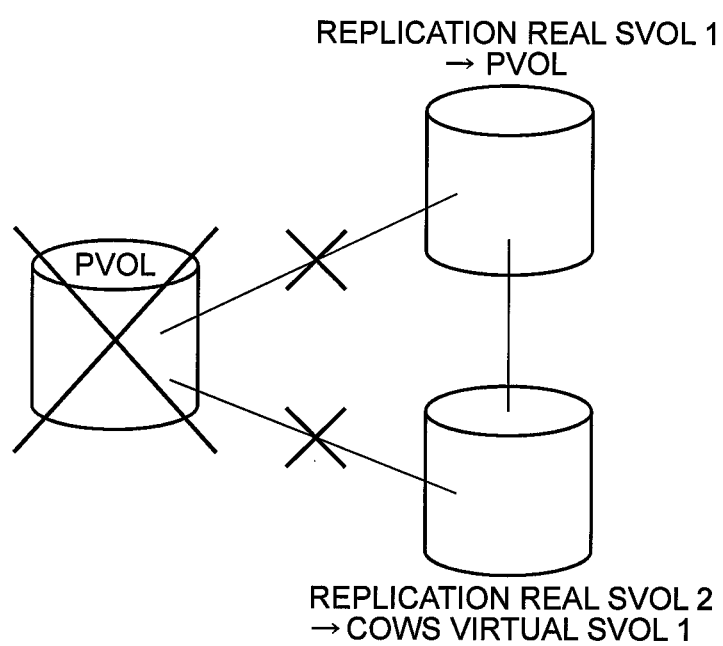
FIG. 22B shows respective logical volumes subsequent to switching the data storage mode in the seventh embodiment.

In this embodiment, it is supposed that an SVOL in the pre-switch data storage mode is the PVOL of the SVOL in the post-switch data storage mode. More specifically, for example, it is supposed that there are two replication real SVOLs 1 and 2 relative to the PVOL. For example, as shown in FIG. 22A, when the PVOL and replication real SVOL 1 have the same contents, and a switch is to be made from replication storage to COWS storage, the switch program 2203, as shown in FIG. 22B, can make replication real SVOL 1 the PVOL, can make replication real SVOL 2 the COWS virtual SVOL 1, and can discard the original PVOL.

When there is a plurality of replication real SVOLs, it is supposed that one of the replication real SVOLs is changed to the COWS virtual PVOL, and the other replication real SVOL is changed to the COWS virtual SVOL, which is the SVOL that treats the COWS virtual PVOL as the PVOL.

First, as shown in FIGS. 5 and 7, a migration BM is used, and data is referenced in order from the head of the VOL. Of the replication real SVOLs 1, 2 and 3, replication real SVOL 1 is made the COWS virtual PVOL, and replication real SVOLs 2 and 3 are respectively changed to COWS virtual SVOLs, which are SVOLs that treat this post-change COWS virtual PVOL as the PVOL.

A determination is made as to whether or not the data from the respective leading real areas of replication real SVOLs 2 and 3 are the same as that of replication real SVOL 1. If the data element stored in a determination-targeted real area (a real area in replication real SVOLs 2 and 3) and the data element stored in the real area of replication real SVOL 1 are the same, when this determination-targeted real area is made the access destination, the real area in replication real SVOL 1 is made the access destination (that is, the real areas are mapped). More specifically, the same processing as that of Step 12001 is carried out for a determination-targeted real area (a real area in replication real SVOLs 2 and 3). When the data element stored in a determination-targeted real area (a real area in replication real SVOLs 2 and 3), and the data element stored in a real area of replication real SVOL 1 corresponding thereto differ, the same processing as that of Step 2014 is carried out for the determination-targeted real area.

By so doing, when a write is issued to the original replication real PVOL, the write data can be written to the replication real PVOL and the above-mentioned replication real SVOL 1, and only the addresses for referencing the data elements can be stored in replication real SVOLs 2 and 3, thereby reducing the storage area required for storing the data elements, and limiting the number of write processes to one.

When there are n number of SVOLs above, the pair relationships for the respective n number of SVOLs are independent relationships. Further, when a write request specifying a PVOL constituting a snapshot is received, if the copying of a data element to an SVOL has not ended, a copy process must be carried out for the respective n number of SVOLs before storing the write data. As for this copy process, if n copies are created, copying must be carried out n times. But if the processing of the seventh embodiment is implemented, copying is only carried out one time.

As a variation of the above, there is also a method in which a QS virtual SVOL is treated as the PVOL of another QS virtual SVOL.

A number of embodiments of the present invention have been explained above, but these are simply examples for explaining the present invention, and do not purport to limit the scope of the present invention solely to these embodiments. The present invention can be put into practice in a variety of other aspects. For example, it is also possible to combine two or more of the plurality of embodiments described hereinabove.

What is claimed is:

1. A storage system, comprising:
one or more logical volumes, which has at least one of a primary volume and a secondary volume, which constitutes a volume pair together with the primary volume; and
a controller, which writes a data element stored in the primary volume to the secondary volume, which constitutes a volume pair with the primary volume, in accordance with a selected storage mode, which is a data storage mode selected from a plurality of types of data storage modes,
wherein the controller switches the selected storage mode from the currently selected type of data storage mode to a type of data storage mode that differs therefrom,
wherein the controller, upon receiving an I/O command from a computer, accesses a logical volume specified by this I/O command and the storage area thereof, changes a type of the secondary volume from the type corresponding to the pre-switch data storage mode to the type corresponding to the post-switch data storage mode by carrying out specified processing for respective storage areas constituting the secondary volume conforming to the pre-switch data storage mode when switching the selected storage mode, and executes the selected storage mode switching while receiving an I/O command from the computer, and when the I/O command received from the computer is a write command, controls writing of the write-targeted data element conforming to this write command based on whether or not the write destination specified by this write command is a primary volume or a pre-switch secondary volume, and whether or not the write-destination storage area is a storage area for which the specified processing has been completed.

2. A storage system, comprising:
one or more logical volumes, which has at least one of a primary volume and a secondary volume, which constitutes a volume pair together with the primary volume; and
a controller, which writes a data element stored in the primary volume to the secondary volume, which constitutes a volume pair with the primary volume, in accordance with a selected storage mode, which is a data storage mode selected from a plurality of types of data storage modes,
wherein the controller switches the selected storage mode from the currently selected type of data storage mode to a type of data storage mode that differs therefrom,
wherein the controller switches the selected storage mode based on at least one of the number of data elements stored in the secondary volume; the number of mutually duplicated data elements that existing in a plurality of secondary volumes constituting a plurality of volume pairs with the primary volume, and the number of accesses generated to the secondary volume, and
wherein the controller compares a first value, which is computed based on one or more first data elements stored in a certain secondary volume of the plurality of secondary volumes, and which has a smaller data size than this one or more first data elements, against a second value, which is computed based on one or more second data elements stored in a different secondary volume than the certain secondary volume, and which has a smaller data size than this one or more second data elements, and if the first value and the second value do not match, determines that the first data element and the second data element do not duplicate one another, if the first value and the second value do match, compares the first data element against the second data element, and if the first data element and the second data element do not match, determines that the first data element and the second data element do not duplicate one another, and if the first data element and the second data element do match, determines that the first data element and the second data element duplicate one another.

3. The storage system according to claim 2, wherein the first value is either a hash value of the one or more first data elements, or a redundancy code corresponding to the one or more first data elements, and the second value is either a hash value of the one or more second data elements, or a redundancy code corresponding to the one or more second data elements.

4. A storage system, comprising:
one or more logical volumes, which has at least one of a primary volume and a secondary volume, which constitutes a volume pair together with the primary volume; and
a controller, which writes a data element stored in the primary volume to the secondary volume, which constitutes a volume pair with the primary volume, in accordance with a selected storage mode, which is a data storage mode selected from a plurality of types of data storage modes,
wherein the controller switches the selected storage mode from the currently selected type of data storage mode to a type of data storage mode that differs therefrom,
wherein, when switching the selected storage mode, the controller changes the type of the secondary volume from the type corresponding to the pre-switch data storage mode to the type corresponding to the post-switch data storage mode by carrying out specified processing for the respective storage areas constituting the pre-switch secondary volume conforming to the pre-switch data storage mode, and if the data element stored in the pre-switch secondary volume is an encrypted data element, makes the data element stored in the post-switch secondary volume an encrypted data element, and wherein the controller issues a warning to a user when the data element stored in the post-switch secondary volume is not made an encrypted data element even though the data element stored in the pre-switch secondary volume is an encrypted element.

5. A storage system, comprising:

one or more logical volumes, which has at least one of a primary volume and a secondary volume, which constitutes a volume pair together with the primary volume; and a controller, which writes a data element stored in the primary volume to the secondary volume, which constitutes a volume pair with the primary volume, in accordance with a selected storage mode selected from a plurality of types of data storage modes for controlling how the controller duplicates data elements from the primary volume to the secondary volume, wherein the controller switches the selected storage mode from the currently selected type of data storage mode to a type of data storage mode that differs from the selected storage mode so that data elements are duplicated from the primary volume to the secondary volume according to the type of data storage mode that differs from the currently selected type of data storage mode, wherein, when switching the selected storage mode, the controller changes the type of the secondary volume from the type corresponding to the pre-switch data storage mode to the type corresponding to the post-switch data storage mode by carrying out specified processing for the respective storage areas constituting the pre-switch secondary volume conforming to the pre-switch data storage mode, and if the data element stored in the pre-switch secondary volume is an encrypted data element, makes the data element stored in the post-switch secondary volume an encrypted data element, and wherein, if an encryption method and/or encryption key used to encrypt the data element stored in the primary volume differ from an encryption method and/or encryption key used to encrypt the data element stored in the pre-switch secondary volume, the controller changes the encryption method and/or encryption key of the data element stored in the post-switch secondary volume to the encryption method and/or encryption key of the data element stored in the primary volume.

6. A storage system, comprising:

one or more logical volumes, which has at least one of a primary volume and a secondary volume, which constitutes a volume pair together with the primary volume; and a controller, which writes a data element stored in the primary volume to the secondary volume, which constitutes a volume pair with the primary volume, in accordance with a selected storage mode, which is a data storage mode selected from a plurality of types of data storage modes, wherein the controller switches the selected storage mode from the currently selected type of data storage mode to a type of data storage mode that differs therefrom, wherein the controller has a cache memory, and when, in response to a read command from a computer, there is a cache hit signifying that the read-targeted data element is in the cache memory, sends this data element to the computer, and when there is no the cache hit, reads the data element from the logical volume specified by this read command, stores the data element in the cache memory, and sends the data element stored in the cache memory to the computer, a first linked volume comprising a first logical volume and a second logical volume is provided, the controller creates a second linked volume comprising a third logical volume and a fourth logical volume by applying a non-duplication storage mode of the plurality of types of data storage modes to the first linked volume, at least the first logical volume of the first through fourth logical volumes is a real logical volume formed on the basis of a physical storage device, a first volume pair is constituted by the first logical volume and the third logical volume, the first logical volume is the primary volume, and the third logical volume is a secondary volume that treats the first logical volume as the primary volume, a second volume pair is constituted by the second logical volume and the fourth logical volume, the second logical volume is the primary volume, and the fourth logical volume is a secondary volume that treats the second logical volume as the primary volume, the non-duplication storage mode is a storage mode in which, when duplicate data elements are stored in a plurality of secondary volumes, which respectively make up a plurality of volume pairs with the primary volume, one storage area in which one data element is stored is associated to the other storage area in which the other data element is stored, so that when an access is generated to the one storage area thereafter, access is carried out to the other storage area associated to the one storage area, either a data element that is shared by the first linked volumes and second linked volumes, or a data element with a low cache hit ratio is stored in the first logical volume, and either a data element, which is not the shared data element, or a data element with a high cache hit ratio, is stored in the second logical volume.

7. A storage system, comprising:

one or more logical volumes, which has at least one of a primary volume and a secondary volume, which constitutes a volume pair together with the primary volume; and a controller, which writes a data element stored in the primary volume to the secondary volume, which constitutes a volume pair with the primary volume, in accordance with a selected storage mode, which is a data storage mode selected from a plurality of types of data storage modes, wherein the controller switches the selected storage mode from the currently selected type of data storage mode to a type of data storage mode that differs therefrom, wherein the one or more logical volumes comprise a pool volume, which is a logical volume constituting a pool, the controller either switches the selected storage mode from a replication mode to a snapshot mode, or switches the selected storage mode from the snapshot mode to the replication mode, in the replication mode, the secondary volume is a real logical volume formed based on a physical storage device, and stores all the data elements stored in the primary volume, and in the snapshot mode, a snapshot image of the primary volume is constituted by the primary volume and the secondary volume, and this secondary volume is a virtual volume, which is a virtual logical volume, the virtual volume is constituted by a plurality of virtual areas, which is a plurality of virtual storage areas, and a pool area, which is a storage area constituting the pool volume, is allocated to the virtual area, and a data element stored in this virtual area is stored in the allocated pool area, and wherein, if the pre-switch data storage mode is the replication mode, the controller switches the selected storage mode from the replication mode to the snapshot mode when at least one of following occurs: a consumption rate, which is a ratio of the total amount of data elements relative to a storage capacity of the secondary volume, is lower than a prescribed consumption rate; the total amount of mutually duplicated data elements in a plurality of secondary volumes constituting a plurality of volume pairs with the primary volume is greater than a prescribed total amount; and a frequency of accesses to the secondary volume is lower than a prescribed access frequency.

8. A storage system, comprising:

one or more logical volumes, which has at least one of a primary volume and a secondary volume, which constitutes a volume pair together with the primary volume; and a controller, which writes a data element stored in the primary volume to the secondary volume, which constitutes a volume pair with the primary volume, in accordance with a selected storage mode selected from a plurality of types of data storage modes for controlling how the controller duplicates data elements from the primary volume to the secondary volume, wherein the controller switches the selected storage mode from the currently selected type of data storage mode to a type of data storage mode that differs from the selected storage mode so that data elements are duplicated from the primary volume to the secondary volume according to the type of data storage mode that differs from the currently selected type of data storage mode, wherein the one or more logical volumes comprise a pool volume, which is a logical volume constituting a pool, wherein the controller either switches the selected storage mode from a replication mode to a snapshot mode, or switches the selected storage mode from the snapshot mode to the replication mode, wherein in the replication mode, the secondary volume is a real logical volume formed based on a physical storage device, and stores all the data elements stored in the primary volume, wherein in the snapshot mode, a snapshot image of the primary volume is constituted by the primary volume and the secondary volume, and this secondary volume is a virtual volume, which is a virtual logical volume, the virtual volume is constituted by a plurality of virtual areas, which is a plurality of virtual storage areas, and a pool area, which is a storage area constituting the pool volume, is allocated to the virtual area, and a data element stored in this virtual area is stored in the allocated pool area, and wherein, if the pre-switch data storage mode is the snapshot mode, the controller switches the selected storage mode from the snapshot mode to the replication mode when at least one of following occurs: a consumption rate, which is a ratio of the total amount of data elements relative to a storage capacity of the secondary volume, is higher than a prescribed consumption rate; the total amount of mutually duplicated data elements in a plurality of secondary volumes constituting a plurality of volume pairs with the primary volume is smaller than a prescribed total amount; and a frequency of accesses to the secondary volume is higher than a prescribed access frequency.

9. A storage system, comprising:

one or more logical volumes, which has at least one of a primary volume and a secondary volume, which constitutes a volume pair together with the primary volume; and a controller, which writes a data element stored in the primary volume to the secondary volume, which constitutes a volume pair with the primary volume, in accordance with a selected storage mode selected from a plurality of types of data storage modes for controlling how the controller duplicates data elements from the primary volume to the secondary volume, wherein the controller switches the selected storage mode from the currently selected type of data storage mode to a type of data storage mode that differs from the selected storage mode so that data elements are duplicated from the primary volume to the secondary volume according to the type of data storage mode that differs from the currently selected type of data storage mode, wherein the one or more logical volumes comprise a pool volume, which is a logical volume constituting a pool, wherein the controller either switches the selected storage mode from a replication mode to a snapshot mode, or switches the selected storage mode from the snapshot mode to the replication mode, wherein in the replication mode, the secondary volume is a real logical volume formed based on a physical storage device, and stores all the data elements stored in the primary volume, wherein in the snapshot mode, a snapshot image of the primary volume is constituted by the primary volume and the secondary volume, and this secondary volume is a virtual volume, which is a virtual logical volume, the virtual volume is constituted by a plurality of virtual areas, which is a plurality of virtual storage areas, and a pool area, which is a storage area constituting the pool volume, is allocated to the virtual area, and a data element stored in this virtual area is stored in the allocated pool area, wherein the snapshot modes are a duplication snapshot mode and a non-duplication snapshot mode, wherein in the duplication snapshot mode, when a plurality of secondary volumes are present for one primary volume, a data element in the one primary volume is saved to each of the plurality of secondary volumes, wherein in the non-duplication snapshot mode, when a plurality of secondary volumes are present for one primary volume, a data element in the one primary volume is saved to one secondary volume in a certain virtual area of the plurality of secondary volumes, and virtual areas in respective other secondary volumes in the plurality of secondary volumes are associated to the certain virtual area, or to a pool area allocated to the certain virtual area, and wherein the controller either switches the selected storage mode from the replication mode to the duplication snapshot mode, and thereafter switches from the duplication snapshot mode to the non-duplication snapshot mode, or switches the selected storage mode from the replication mode to the non-duplication snapshot mode, or switches the selected storage mode from the non-duplication snapshot mode to the duplication snapshot mode, and thereafter switches from the duplication snapshot mode to the replication mode, or switches from the non-duplication snapshot mode to the replication mode.

10. The storage system according to claim 9, wherein the controller, if the pre-switch data storage mode is the replication mode, switches the selected storage mode from the replication mode to the duplication snapshot mode when at least one of following occurs: the total amount of mutually duplicated data elements in a plurality of secondary volumes constituting a plurality of volume pairs with the primary volume is not less than a first threshold; a frequency of accesses to a secondary volume is less than a third threshold; and a consumption rate, which is a ratio of the total amount of data elements relative to a storage capacity of the secondary volume, is less than a fifth threshold, and
when the pre-switch data storage mode is the duplication snapshot mode, switches the selected storage mode from the duplication snapshot mode to the non-duplication snapshot mode what at least one of following occurs: the total amount of the duplicated data elements is not less than a second threshold, which is higher than the first threshold; and a frequency of accesses to a secondary volume is less than a fourth threshold, which is lower than the third threshold.

11. The storage system according to claim 10, wherein the controller, when the pre-switch data storage mode is the replication mode, switches the selected storage mode from the replication mode to the non-duplication snapshot mode what at least one of following occurs: the total amount of the duplicated data elements is not less than a second threshold; a frequency of accesses to the secondary volume is less than a fourth threshold; and the consumption rate is not less than a fifth threshold.

12. The storage system according to claim 7, wherein the controller makes a secondary volume in a pre-switch data storage mode the primary volume of a secondary volume in a post-switch data storage mode.

13. The storage system according to claim 7, wherein, when switching the selected storage mode, the controller changes the type of the secondary volume from the type corresponding to the pre-switch data storage mode to the type corresponding to the post-switch data storage mode by carrying out specified processing for the respective storage areas constituting the pre-switch secondary volume conforming to the pre-switch data storage mode, and if the data element stored in the pre-switch secondary volume is an encrypted data element, makes the data element stored in the post-switch secondary volume an encrypted data element.

14. A method of controlling a storage system, the storage system comprising: one or more logical volumes, which has at least one of a primary volume and a secondary volume, which constitutes a volume pair together with the primary volume; and a controller, which writes a data element stored in the primary volume to the secondary volume, which constitutes a volume pair with the primary volume, in accordance with a selected storage mode, which is a data storage mode selected from a plurality of types of data storage modes, and wherein the one or more logical volumes comprise a pool volume, which is a logical volume constituting a pool, the method comprising:
switching, by the controller, the selected storage mode from the currently selected type of data storage mode to a type of data storage mode that differs therefrom;
switching, by the controller, either the selected storage mode from a replication mode to a snapshot mode or the selected storage mode from the snapshot mode to the replication mode,
wherein in the replication mode, the secondary volume is a real logical volume formed based on a physical storage device, and stores all the data elements stored in the primary volume,
wherein in the snapshot mode, a snapshot image of the primary volume is constituted by the primary volume and the secondary volume, and this secondary volume is a virtual volume, which is a virtual logical volume, the virtual volume is constituted by a plurality of virtual areas, which is a plurality of virtual storage areas, and a pool area, which is a storage area constituting the pool volume, is allocated to the virtual area, and a data element stored in this virtual area is stored in the allocated pool area, and
wherein, if the pre-switch data storage mode is the replication mode, the controller switches the selected storage mode from the replication mode to the snapshot mode when at least one of following occurs: a consumption rate, which is a ratio of the total amount of data elements relative to a storage capacity of the secondary volume, is lower than a prescribed consumption rate; the total amount of mutually duplicated data elements in a plurality of secondary volumes constituting a plurality of volume pairs with the primary volume is greater than a prescribed total amount; and a frequency of accesses to the secondary volume is lower than a prescribed access frequency.

15. The storage system according to claim 7, wherein, when switching the selected storage mode, the controller changes a type of the secondary volume from the type corresponding to the pre-switch data storage mode to the type corresponding to the post-switch data storage mode by carrying out specified processing for respective storage areas constituting the secondary volume conforming to the pre-switch data storage mode, and in the specified processing, releases this storage area if the data element stored in the storage area, which is the target of this specified processing, is a prescribed data pattern.

16. The storage system according to claim 7, wherein the controller either switches the primary volume from a real logical volume formed on the basis of a physical storage device to a virtual logical volume, or switches the primary volume from a virtual logical volume to the real logical volume, in accordance with the number of data elements of a prescribed data pattern stored in the primary volume.

17. The storage system according to claim 16, wherein, in switching from the real logical volume to a virtual logical volume, the controller releases a storage area in which a data element is stored when the data element stored in the real logical volume is a prescribed data pattern.

18. The storage system according to claim 13, wherein the controller, if a data element stored in a secondary volume in a post-switch data storage mode is encrypted, but the data element stored in the primary volume corresponding to this secondary volume is not encrypted, encrypts the data stored in this primary volume.

* * * * *